US008659889B2

(12) United States Patent
Dolci et al.

(10) Patent No.: US 8,659,889 B2
(45) Date of Patent: Feb. 25, 2014

(54) DOCKING STATION FOR PROVIDING DIGITAL SIGNAGE

(75) Inventors: Dominic E. Dolci, Oakland, CA (US); Cesar Lozano Villarreal, Sunnyvale, CA (US); Victoria A. Spielmann, San Francisco, CA (US); Ricardo A. Mariano, Hayward, CA (US); Alexander M. Kwan, Los Altos Hills, CA (US); James G. Smeenge, Los Gatos, CA (US); Daniele G. De Iuliis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/112,999

(22) Filed: May 20, 2011

(65) Prior Publication Data

US 2012/0293924 A1 Nov. 22, 2012

(51) Int. Cl.
*G06F 1/16* (2006.01)
(52) U.S. Cl.
USPC ...................................... 361/679.41; 439/374
(58) Field of Classification Search
USPC ....................................... 361/679.41; 439/374
See application file for complete search history.

(56) References Cited

U.S. PATENT DOCUMENTS

| | | | | |
|---|---|---|---|---|
| 5,436,792 A | * | 7/1995 | Leman et al. | 361/679.44 |
| 5,822,185 A | * | 10/1998 | Cavello | 361/679.42 |
| 6,188,572 B1 | * | 2/2001 | Liao et al. | 361/679.42 |
| 6,231,371 B1 | * | 5/2001 | Helot | 439/374 |
| 6,280,212 B1 | * | 8/2001 | Nguyen et al. | 439/157 |
| 6,407,914 B1 | * | 6/2002 | Helot | 361/679.41 |
| 6,424,524 B2 | * | 7/2002 | Bovio et al. | 361/679.45 |

(Continued)

FOREIGN PATENT DOCUMENTS

| | | |
|---|---|---|
| ES | 1073857 U | 2/2011 |
| JP | 2006-524877 A | 11/2006 |

(Continued)

OTHER PUBLICATIONS

Partial International Search Report for International Application No. PCT/US2012/038866, mailed on Aug. 17, 2012, 6 pages.

(Continued)

*Primary Examiner* — Adrian S Wilson
(74) *Attorney, Agent, or Firm* — Kilpatrick Townsend & Stockton LLP

(57) ABSTRACT

Various embodiments of digital signage systems and docking stations are described. In one embodiment, a digital signage system includes an electronic device having a rear surface and an opposing front surface at which a display of the electronic device may be viewed. The system also includes a body for supporting the electronic device. A recessed region is formed in the body from a top surface of the body, and the electronic device is positioned within the recessed region such that the rear surface of the electronic device fits entirely within the recessed region and the front surface of the electronic device is substantially flush with a portion of a top surface of the body that surrounds the recessed region. An aperture may be formed at least partially through the recessed region for receiving a cable assembly operable to connect to the electronic device. An elongated cutout may also be formed, extending from the aperture to an edge or edge surface of the body, and sized so that an insulated wire of the cable assembly can extend from the aperture to the edge or edge surface of the body.

22 Claims, 17 Drawing Sheets

(56) References Cited

U.S. PATENT DOCUMENTS

| | | | |
|---|---|---|---|
| 6,739,654 B1* | 5/2004 | Shen et al. | 297/188.04 |
| 6,776,660 B1 | 8/2004 | Kubota et al. | |
| 7,036,879 B2* | 5/2006 | Chang | 297/217.3 |
| 7,201,354 B1* | 4/2007 | Lee | 248/231.9 |
| 7,502,225 B2* | 3/2009 | Solomon et al. | 361/679.41 |
| D592,189 S* | 5/2009 | Corsini et al. | D14/217 |
| 7,580,255 B2 | 8/2009 | Crooijmans et al. | |
| 7,627,343 B2 | 12/2009 | Fadell et al. | |
| 7,719,830 B2 | 5/2010 | Howarth et al. | |
| 7,791,586 B2* | 9/2010 | Shalam | 345/108 |
| D636,778 S* | 4/2011 | Corsini et al. | D14/434 |
| D644,228 S* | 8/2011 | Corsini et al. | D14/434 |
| D644,229 S* | 8/2011 | Corsini et al. | D14/434 |
| 8,093,486 B2* | 1/2012 | Behringer et al. | 84/615 |
| 8,201,687 B2* | 6/2012 | Zeliff et al. | 206/320 |
| 2001/0001083 A1 | 5/2001 | Helot | |
| 2002/0072390 A1 | 6/2002 | Uchiyama | |
| 2003/0137584 A1* | 7/2003 | Norvell et al. | 348/61 |
| 2003/0184137 A1* | 10/2003 | Jost | 297/219.1 |
| 2003/0222848 A1* | 12/2003 | Solomon et al. | 345/156 |
| 2004/0224638 A1 | 11/2004 | Fadell et al. | |
| 2004/0230725 A1 | 11/2004 | Chen et al. | |
| 2004/0233631 A1* | 11/2004 | Lord | 361/686 |
| 2005/0162824 A1* | 7/2005 | Thompson | 361/686 |
| 2005/0200697 A1* | 9/2005 | Schedivy et al. | 348/61 |
| 2005/0204596 A1* | 9/2005 | Peng | 40/320 |
| 2006/0052097 A1* | 3/2006 | Struthers et al. | 455/422.1 |
| 2006/0061958 A1* | 3/2006 | Solomon et al. | 361/686 |
| 2006/0109388 A1* | 5/2006 | Sanders et al. | 348/837 |
| 2006/0148575 A1* | 7/2006 | Vitito | 463/46 |
| 2006/0250767 A1* | 11/2006 | Brophy et al. | 361/686 |
| 2007/0002533 A1* | 1/2007 | Kogan et al. | 361/686 |
| 2007/0047198 A1* | 3/2007 | Crooijmans et al. | 361/686 |
| 2007/0070192 A1* | 3/2007 | Shalam | 348/61 |
| 2008/0067842 A1* | 3/2008 | Chang | 297/217.3 |
| 2008/0092043 A1 | 4/2008 | Trethewey | |
| 2008/0307144 A1 | 12/2008 | Minoo | |
| 2009/0107878 A1 | 4/2009 | Daley | |
| 2009/0292851 A1* | 11/2009 | Mead et al. | 710/303 |
| 2009/0303692 A1 | 12/2009 | Terlizzi | |
| 2010/0062615 A1 | 3/2010 | Prest | |
| 2010/0073862 A1* | 3/2010 | Carnevali | 361/679.43 |
| 2010/0134964 A1* | 6/2010 | Smith et al. | 361/679.2 |
| 2010/0138581 A1* | 6/2010 | Bird et al. | 710/303 |
| 2010/0162326 A1* | 6/2010 | Bonar | 725/77 |
| 2010/0169531 A1* | 7/2010 | Bae | 710/303 |
| 2011/0283868 A1* | 11/2011 | Behringer et al. | 84/622 |
| 2012/0033375 A1* | 2/2012 | Madonna et al. | 361/679.43 |
| 2012/0153870 A1* | 6/2012 | Kirkup et al. | 315/312 |
| 2012/0189156 A1* | 7/2012 | Leung | 381/387 |
| 2012/0293924 A1 | 11/2012 | Dolci et al. | |

FOREIGN PATENT DOCUMENTS

| | | |
|---|---|---|
| JP | 2010-009460 A | 1/2010 |
| JP | 3162878 U | 9/2010 |
| WO | 2007/081568 A2 | 7/2007 |
| WO | 2011/153341 A1 | 12/2011 |

OTHER PUBLICATIONS

C. Davies, "Alexis StudioDock for iPad turn tablet into pro-sudio system", www.Slashgear.com/alesis-studiodock-for-ipad-turns-tablet-into-pro-audio-system-14126471/, Jan. 14, 2011, 2 pages.

"iPad 2 Display Dock", EcoolGadgets.com, Suvash, www.ecoolgadgets.com/ipad~2~display~dock/, Jul. 24, 2011, 1 page.

Search and Examination Report for Great Britain Patent Application No. GB120876439, mailed on Aug. 30, 2012, 7 pages.

Office Action for Australian Patent Application No. 2012202947, Jun. 24, 2013, 3 pages.

Search and Examination Report for Great Britain Patent Application No. GB1208764.9, 3 pages.

International Preliminary Report on Patentability for International PCT Application No. PCT/US2012/038866, mailed Nov. 28, 2013, 12 pages.

Office Action for Japanese Patent Application No. 2012-128373, issued on Sep. 24, 2013, 2 pages.

* cited by examiner

DOCKING STATION FOR PROVIDING DIGITAL SIGNAGE

BACKGROUND

1. Field of the Invention

The present invention relates generally to docking stations for handheld electronic devices. More particularly, the present invention relates to a docking station with a recessed region for mounting an electronic device flush with an upper surface of the docking station for the purposes of providing digital signage.

2. Description of the Related Art

Various types of docking stations exist today for portable electronic devices such as cellular phones, personal digital assistants (PDA), media players (e.g., music player or video player), cameras, game player and the like. The docking stations are often provided for enabling communication between the portable electronic device and other electronic devices such as speakers, monitors, personal computers, and printers, without having to disconnect and reconnect cables.

By way of example, the iPod product line, which is manufactured by Apple, Inc. of Cupertino, Calif., includes functionality for outputting audio. However, the speakers built into the iPod products may be insufficient for some users in some scenarios. Accordingly, users may acquire a docking station which enables an iPod to be connected to larger speakers that provide a sufficient audio output for the given scenario.

In this sense, docking stations are often designed to enhance the functionality of the handheld electronic device. As a result, a common feature of known docking stations is that they are structured to enable access to functionality of the handheld electronic device. In this fashion, a user may exploit the functionality of the handheld electronic device and improve on that functionality by coupling the device to other electronic devices.

However, the design of such docking devices often fails to consider the aesthetic appeal of the handheld electronic device provided in combination with the docking device. Further, such docking devices are often designed for individual, not public, use.

In the realm of advertising, it is well-known to provide product advertising in various forms, such as via paper displays, television or other digital displays, billboards, and the like. Advertising via digital displays is typically provided by arbitrarily mounting the digital display in a high traffic (vehicular, pedestrian, and the like) area. A variety of products may then be advertised on the digital display.

However, product advertising via digital displays is often considered to be aesthetically displeasing. Further, there is a significant disconnect between the digital display and the products being advertised.

SUMMARY

Embodiments of the present invention generally concern systems and apparatus's for providing digital signage via a docking station that overcome some or all of the above deficiencies in the related art. The docking station may include various features for more tightly coupling digital displays and products being advertised, for increasing the aesthetic pleasantry of the combined electronic device and docking station, and/or for enabling access to select functionality of the electronic device.

For example, the docking station may include a body having a recessed region. The recessed region may be shaped to receive the electronic device such that, when the electronic device is mounted within the recessed region, an exposed surface of the electronic device is substantially flush with a portion of the upper surface that surrounds the recessed region. As a result, the combined docking station and electronic device have a combined exposed surface that is substantially smooth and continuous, and the combined docking station and electronic device may have the appearance of a single unit.

For another example, the docking station may include an aperture formed at least partially through the body from the recessed region toward a bottom surface of the body, and an elongated cutout extending from the aperture to an edge or edge surface of the body. The aperture may be sized to receive a cable assembly operable to connect to the electronic device when the electronic device is mounted within the recessed region. The elongated cutout may be sized so that a cable of the cable assembly can extend from the aperture to the edge or edge surface of the body when the cable is arranged within the elongated cutout. As a result, when the electronic device is mounted within the recessed region, the cable assembly may be substantially hidden from view, while enabling connectivity to the electronic device.

For yet another example, the docking station may include one or more cutouts formed in the top surface of the body. Stands for supporting one or more additional electronic devices may be mounted within the one or more cutouts. As a result, when additional electronic devices are provided on the stands in addition to an electronic device mounted within the recessed region of the body, the electronic device mounted within the recessed region may serve as a digital advertisement for the additional electronic devices provided on the stands.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the invention are discussed below with reference to FIGS. 1A to 7C. However, those skilled in the art will readily appreciate that the detailed description given herein with respect to these figures is for explanatory purposes only as embodiments of the invention extend beyond these limited embodiments.

Figure 1A:
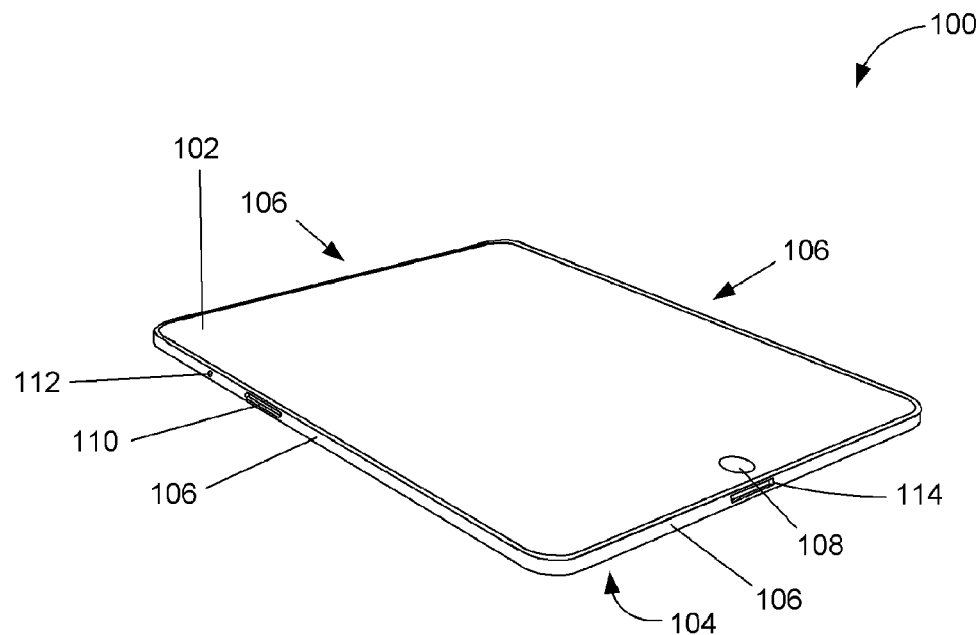
FIG. 1A illustrates a perspective view of an electronic device that may be coupled to a cable assembly according to an embodiment of the present invention.

FIG. 1A illustrates a perspective view of an electronic device 100 that may be coupled to a cable assembly according to an embodiment of the present invention. According to this embodiment, electronic device 100 is a tablet computer. For example, electronic device 100 may be an iPad as manufactured by Apple, Inc. of Cupertino, Calif.; a Toshiba Tablet as manufactured by Toshiba Corp. of Tokyo, Japan; a Z-Pad as manufactured by ZTE Corp. of Shenzhen, China; an EEE Pad as manufactured by Asus of Taipei, Taiwan; a Dell Streak as manufactured by Dell of Austin, Tex.; a Samsung Galaxy as manufactured by Samsung Group of Seoul, South Korea; etc. According to other embodiments of the present invention, electronic device 100 is not a tablet computer. Rather, electronic device 100 may be any portable electronic device with a display. For example, electronic device may be a cellular phone, a personal digital assistant (PDA), a media player (e.g., music player or video player), a camera, a game player, a laptop computer, a netbook, a booklet, a slate, a convertible notebook, etc.

Electronic device 100 includes an upper surface 102, a rear surface 104, and side surfaces 106. According to one embodiment, upper surface 102 is a digital display. According to another embodiment, upper surface 102 is a digital display incorporating touch screen functionality, thereby enabling a user to operate electronic device 100 by interacting with the display.

Electronic device 100 may also include various buttons on various surfaces for activating various functionality of the device. For example, electronic device 100 may include a multipurpose button 108 arranged on upper surface 102, a volume up and down button 110 on side surface 106, a volume mute button 112 on side surface 106, a power on and off button (not illustrated) on rear surface 104, etc. Electronic device 100 may also include, on various surfaces, various mechanical interfaces for interfacing with other electronic devices and/or accessories. For example, electronic device 100 may include a receptacle connector 114 on a side surface 106 for connecting to other electronic devices via a cable of a cable assembly, an audio jack (not illustrated) on side surface 106 for connecting to speakers, etc. Electronic device 100 may also include other elements causing protrusions from or indentations into surfaces of electronic device 100, such as camera's, microphones, speakers, antenna's, etc.

According to one embodiment, receptacle connector 114 is operable to receive and mechanically couple to a connector such as that described in co-pending U.S. patent application Ser. No. 13/112,995, which is commonly assigned and incorporated herein by reference in its entirety; in another embodiment, receptacle connector 114 is operable to receive and mechanically couple to a 30-pin connector such as that described in U.S. Pat. No. 6,776,660, which is also incorporated herein by reference in its entirety; in yet another embodiment, receptacle connector 114 is operable to receive and mechanically couple to other types of connectors, such as an RS232 serial connector, a USB connector, an S-video connector, a VGA connector, an SDI connector, etc.

Figure 1B:
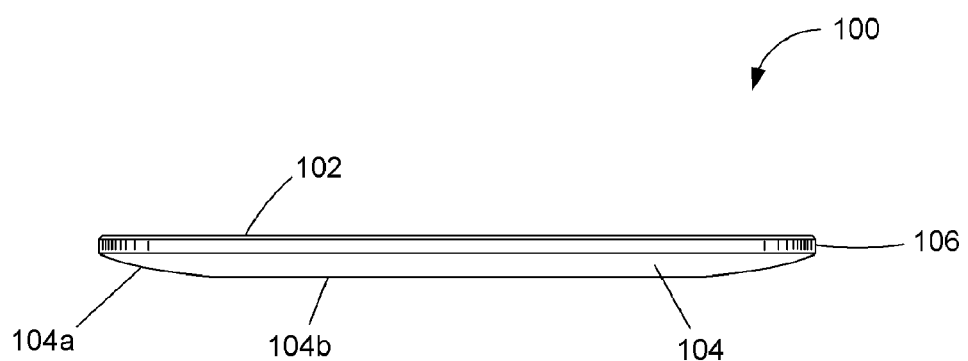
FIG. 1B illustrates a side view of the electronic device shown in FIG. 1A.

FIG. 1B illustrates a side view of the electronic device shown in FIG. 1A. From this view, it is apparent that rear surface 104 is contoured in the shape of a bowl. In some embodiments, rear surface 104 includes curved surfaces 104a and a substantially planar surface 104b. In other embodiments, the entire rear surface 104 is curved such that there are substantially no planar surfaces in rear surface 104. In yet other embodiments, rear surface 104 includes a number of curved surfaces and planar surfaces arranged anywhere on rear surface 104.

Rear surface 104 may protrude from side surfaces 106 by a predetermined depth. For example, rear surface 104 may protrude from side surfaces 106 by a depth of approximately 5 mm. For another example, rear surface 104 may protrude from side surfaces 106 by a depth in a range of approximately 4 mm to 6 mm. For yet another example, rear surface 104 may protrude from side surfaces 106 by a depth greater than 6 mm or less than 4 mm.

Side surfaces 106 may protrude from upper surface 102 by a predetermined depth. For example, side surfaces 106 may protrude from upper surface 102 by a depth of approximately 5 mm For another example, side surfaces 106 may protrude from upper surface 102 by a depth in a range of approximately 4 mm to 6 mm. For yet another example, side surfaces 106 may protrude from upper surface 102 by a depth greater than 6 mm or less than 4 mm.

In some embodiments, side surfaces 106 may be arranged substantially perpendicular to upper surface 102. In other embodiments, side surfaces 106 may be arranged at an angle of less than ninety degrees with respect to upper surface 102, such that side surfaces 106 are directed inwards towards a center of electronic device 100. In some embodiments, side surfaces 106 may be substantially planar, while in other embodiments, side surfaces 106 may be curved inwards. In some embodiments, side surfaces 106 are arranged such that they are continuous with rear surface 106; for example, side surfaces 106 may be mechanically coupled with rear surface 104 such that there is no recognizable disjoint between side surfaces 106 and rear surface 104. In other embodiments, there are no side surfaces 106; for example, rear surface 104 may protrude directly from upper surface 102. In some embodiments, side surfaces 106 have substantially identical angles with respect to one another; for example, all side surfaces 106 may be substantially perpendicular to upper surface 102. In other embodiments, side surfaces 106 have different angles with respect to one another; for example, one of side surfaces 106 may be substantially perpendicular to upper surface 102, while another one of side surfaces 106 may be arranged at an angle of less than ninety degrees with respect to upper surface 102.

Figure 2:
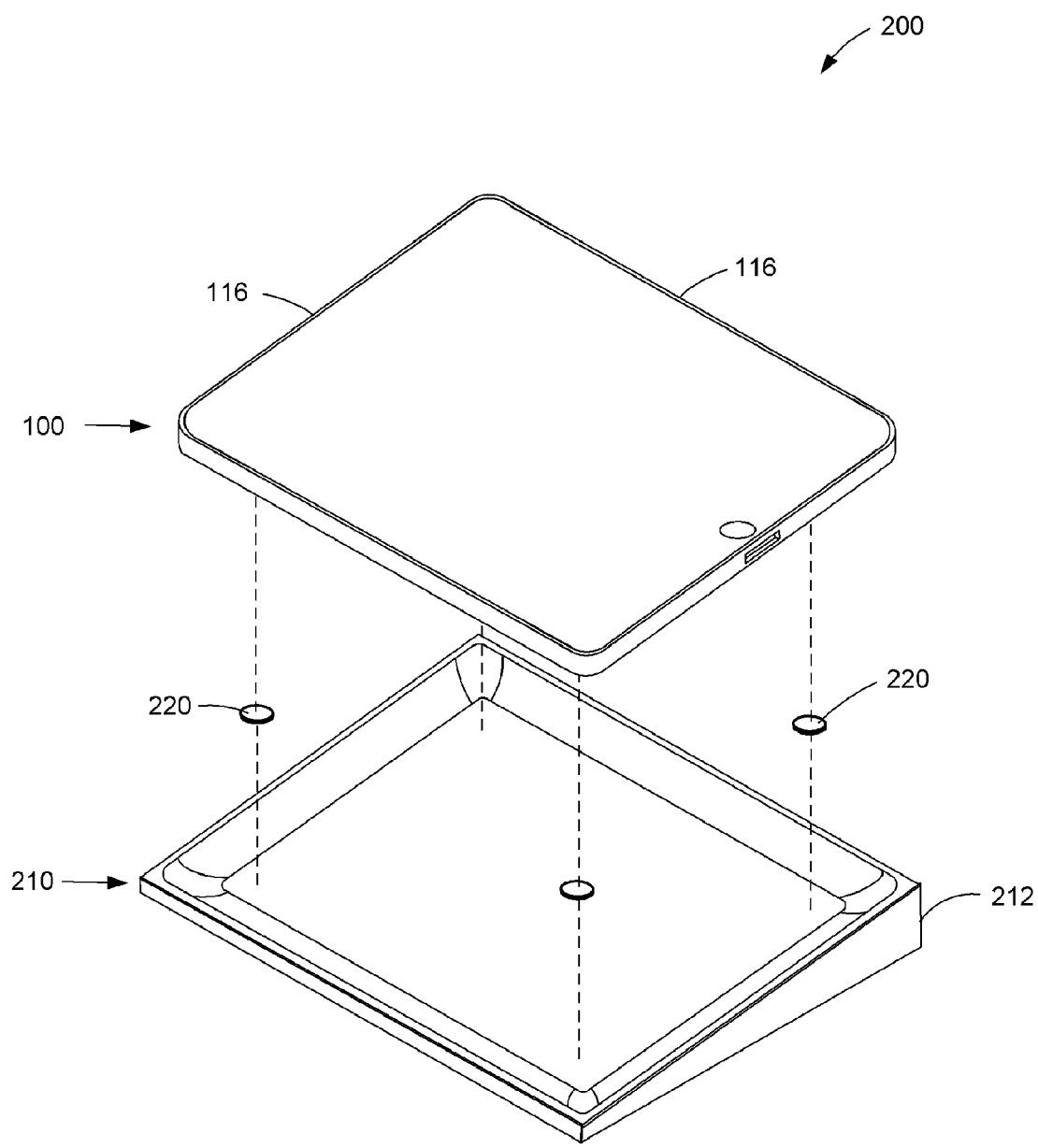
FIG. 2 illustrates a digital signage system according to a first embodiment of the present invention.

FIG. 2 illustrates a digital signage system 200 according to a first embodiment of the present invention. Digital signage system 200 includes an electronic device 100 such as that described with reference to FIGS. 1A and 1B, a docking station 210 for mounting electronic device 100, and optional pads 220 arranged between docking station 210 and electronic device 100.

Docking station 210 includes a body 212 for supporting electronic device 100. Docking station 210 is further described with reference to FIGS. 3 to 7C. In general, however, body 212 includes a top surface having a recessed region formed therein. The recessed region may be shaped to receive electronic device 100 such that when electronic device 100 is positioned within the recessed region, rear surface 104 of electronic device 100 fits entirely within the recessed region while upper surface 102 of electronic device 100 is substantially flush with a portion of the top surface of body 212 that surrounds the recessed region. As previously discussed, in some embodiments, electronic device 100 may include side surfaces 106. Accordingly, in some embodiments, the recessed region of body 212 may be shaped to receive electronic device 100 such that when electronic device 100 is positioned within the recessed region, one or more or all of side surfaces 106 of electronic device 100 abut a surface of the recessed region.

Pads 220 include one or more flexible elements arranged between electronic device 100 and docking station 210. Pads 220 may be made from any type of flexible material; for example, pads 220 may be made from silicone, rubber, cloth, soft plastic, etc. Pads 220 may function to secure electronic device 100 to docking station 210. For example, pads 220 may be bonded to both electronic device 100 and docking station 210 so as to mechanically couple electronic device 100 to docking station 210. Pads 220 may also function to enable activation of buttons arranged on rear surface 104 of electronic device 100. For example, one or more pads 220 may be flexible so that a force applied on upper surface 102 of electronic device 100 causes one or more of pads 220 to deform, thereby causing a button located on rear surface 104 to engage with a surface of the recessed region of docking station 210. According to one embodiment, pads 220 are bonded only to bottom surface 104 of electronic device 100.

Pads 220 may be provided at any location between electronic device 100 and docking station 210. For example, one or more pads 220 may be provided near a center of electronic device 100; for another example, one or more pads 220 may be provided proximate a side surface 106 of electronic device. According to one embodiment, four pads 220 are provided, where each pad 220 is located near a corner of electronic device 100. For example, each pad 220 may be arranged approximately 5 cm away from a nearest corner of electronic device 100. For another example, each pad 220 may be arranged from approximately 2.5 cm to 7.5 cm away from a nearest corner of electronic device 100. For yet another example, each pad 220 may be arranged a distance less than 2.5 cm or greater than 7.5 cm away from a nearest corner of electronic device 100. Providing a pad 220 proximate to each corner of electronic device 100 may advantageously provide a substantially consistent support for electronic device 100, such that electronic device 100 does not tend to significantly rock or pivot within docking station 210.

According to one embodiment, one of pads 220 is located proximate to a button located on rear surface 104 of electronic device 100. For example, one of pads 220 may be located within 3 cm of such a button. For another example, one of pads 220 may be located in a range between 1 cm and 4 cm away from such a button, or at a distance less than 1cm or greater than 4 cm. One of pads 220 may be located proximate to the button such that a force applied to upper surface 102 proximate the button causes the button to activate, deactivate, switch, or the like. For example, the button may be a power button, and upper surface 102 may be a touch screen display. The force required on upper surface 102 proximate the power button may be substantially greater than a force required to control the touch screen display. Accordingly, the touch display may be operable without causing activation of the button. Further, the button may be provided at a location not typically accessed via a touch screen display; for example, near one of side surfaces 106. By such an arrangement, the power button may be hidden from view and generally not accessible. However, for users that are aware of the power button's existence and activation technique, the users may push on the upper surface 102 near the button so as to turn electronic device 100 on or off. Such an arrangement may advantageously enable easy access to functionality of electronic device 100 even where most functionality is disabled (e.g., where the touch screen is disabled, buttons on top surface 102 are disabled, and buttons on side surfaces 106 are either disabled or inaccessible due to electronic device 100 being fitted in docking station 210.

Each of pads 220 may have any one of a variety of shapes. For example, each pad 220 may have a cross section in the shape of a circle, oval, square, rectangle, etc. In one embodiment, each pad 220 may have a cross section in the shape of a circle, and have a variable surface area. For example, an area of a surface of pad 220 bonded to electronic device 100 may be greater than an area of a surface of pad 220 arranged to contact docking station 210.

Each of pads 220 may have any one of a number of dimensions. For example, each pad 220 may have a thickness of approximately 1 mm, a thickness in a range of approximately 0.5 mm to 1.5 mm, or a thickness less than 0.5 mm or greater than 1.5 mm. Each pad 220 may have a maximum diameter of approximately 5 mm, a maximum diameter in a range of approximately 2.5 cm to 7.5 cm, or a maximum diameter less than 2.5 cm or greater than 7.5 cm.

In some embodiments, there are no pads 220. Rather, electronic device 100 may be mechanically coupled to docking station 210 via other means. For example, electronic device 100 may be glued or bonded to docking station 210; for another example, clamps may be provided for mechanically coupling electronic device 100 to docking station 210. In one embodiment, electronic device 100 may be bonded to docking station 210 via an adhesive donut.

The adhesive donut may be shaped to surround an aperture (e.g., aperture 416 as discussed later) formed at least partially through body 212, and sized so as not to interfere with any pads 220. The adhesive donut may be designed so as to bond electronic device 100 to docking station 210 without bonding a cable assembly (e.g., cable assembly 310 as discussed later). For example, the adhesive donut may include a first dual-sided adhesive layer, a second non-adhesive layer, and a third dual-sided adhesive layer. The first layer may be shaped to entirely surround the aperture, and arranged such that one side of the layer may be bonded directly to docking station 210. The second layer may have the same shape as the first layer, and arranged such that one side of the layer may be bonded to the first layer. The third layer may be shaped to surround the aperture while including a cutout for a portion of the cable assembly. The third layer may be arranged such that one side may be bonded to the second layer and another side may be bonded to electronic device 100.

In other embodiments, electronic device 100 is arranged in the recessed region of docking station 210 without a mechanical coupling; for example, the recessed region of docking station 210 may be sized such that electronic device 100 securely fits within the recessed region; for another example, electronic device 100 may be secured to docking station 210 via the effect of gravity. In yet other embodiments, both pads 220 and other means for mechanically coupling electronic device 100 to docking station 210 are provided.

Figure 3:
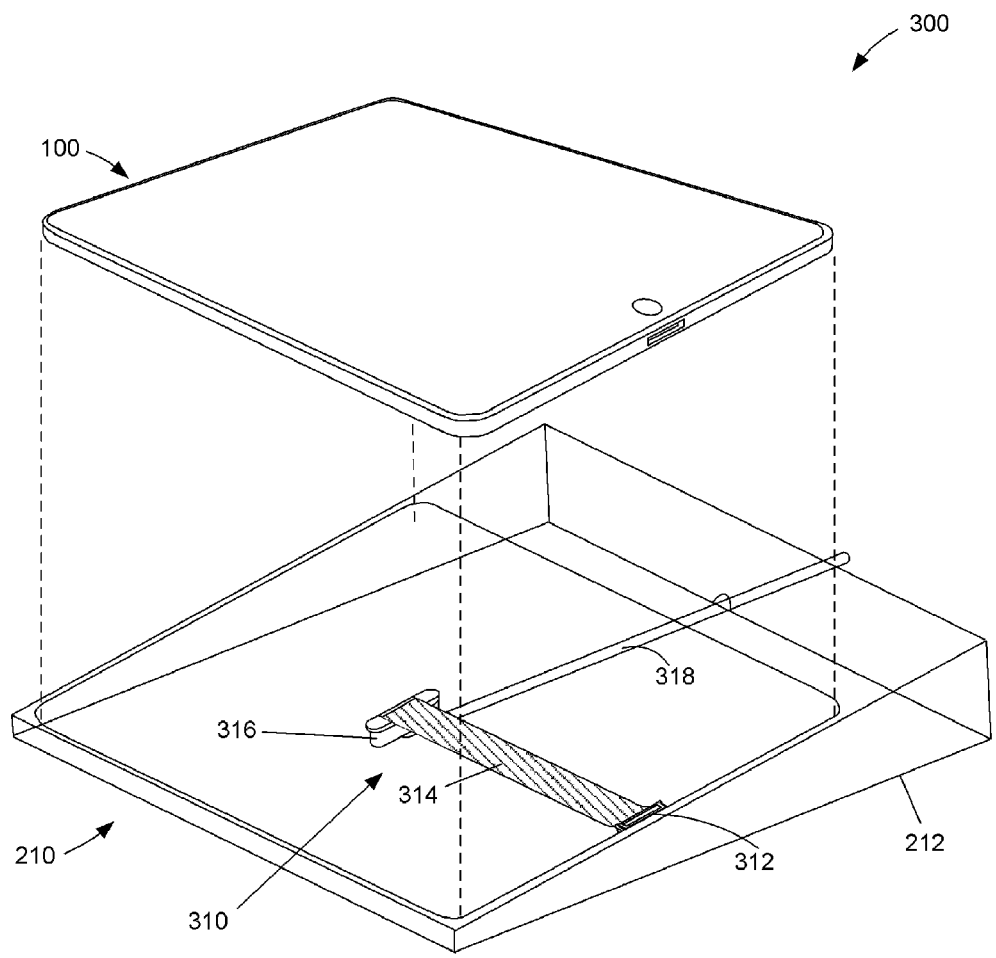
FIG. 3 illustrates a digital signage system according to a second embodiment of the present invention.

FIG. 3 illustrates a digital signage system 300 according to a second embodiment of the present invention. Digital signage system 300 includes an electronic device 100 such as that described with reference to FIGS. 1A, 1B, and 2, a docking station 210 for mounting electronic device 100 as described with reference to FIG. 2, and an optional cable assembly 310 for electronically coupling electronic device 100 to another electronic device or accessory (not illustrated).

Cable assembly 310 may include a plug housing 312 sized for insertion into receptacle connector 114 of electronic device 100. Plug housing 312 may be designed to accommodate a number of pins which, when plug housing 312 is engaged with electronic device 100, make an electrical contact with a number of pins arranged within receptacle connector 114. In one embodiment, plug housing 312 may be designed so as to fit entirely within receptacle connector 114 and have a rear surface that is contoured to and flush with an outer surface (e.g., at least one of rear surface 104 and side surfaces 106) of electronic device 100.

Cable assembly 310 may also include a cable 314 mechanically connected to plug housing 312. For example, an end of cable 314 may be bonded to a surface of plug housing 312. Cable 314 may have one or more conductive traces formed thereon that correspond to and are electrically coupled to the pins located in plug housing 312. For example, the pins located in plug housing 312 may each include a portion that protrudes from plug housing 312. Cable 314 may include holes sized to fit those portions of the pins which protrude from plug housing 312. Cable 314 may then be arranged such that, after fitting the protruding pin portions through the holes of cable 314, the protruding pin portions and holes are soldered so as to establish an electrical connection between the pins and conductive traces electrically coupled to the holes.

Cable 314 may be any thin cable. For example, cable 314 may be a single or multi-core cable in which the cores or electric conductors are guided parallel and adjacent to one another. Cable 314 may include flat conductive traces or strips. Each strip may have a cross section of any shape, such as circular, oval, square, rectangular, etc. The conductive traces or strips may be made of any conductive material. For example, they may be made of tin, copper, etc. The conductive traces or strips may be insulated using any insulating material, such as polyester, dielectric polymers, etc. In some embodiments, cable 314 should be thin enough so as not to interfere with or perturb electronic device 100 when electronic device 100 is arranged in the recessed region of body 212. For example, cable 314 may have a diameter of 0.8 mm, or in a range of 0.5 mm to 1 mm, or less than 0.5 mm or greater than 1 mm. Cable 314 may have a cross section of any shape, such as circular, oval, square, rectangular, etc. According to some embodiments, cable 314 may be flexible or stiff. For example, in one embodiment cable 314 may be a substantially flat flex cable. In another embodiment, cable 314 may be a rounded or otherwise thicker cable that runs through a channel (not shown) in body 212 to connect plug housing 312 to connector base 316.

Cable 314 may be arranged between electronic device 100 and the recessed region of body 212, and extend from an aperture of body 212 to an edge of electronic device 100 (e.g., an edge of upper surface 102, a location on a side surface 106, or an edge of side surface 106). For example, cable 314 may extend from the aperture to side 106 including receptacle connector 114. Cable 254 may also extend in a direction substantially parallel to the one or more pins accommodated in plug housing 312 and toward receptacle connector 114. Plug housing 312 may be mechanically coupled to an end of cable 314 proximate to an edge of electronic device 100. For example, plug housing 312 may be mechanically coupled to an end of cable 314 proximate to side 106 including receptacle connector 114. The aperture of body 212 is further described with reference to FIGS. 4A to 7C.

Cable assembly 310 may also include a connector base 316. Connector base 316 may include a printed circuit board (not illustrated) having one or more connection pads formed thereon. The connection pads may be electrically coupled to respective ones of the conductive traces of cable 314. Connector base 316 may be arranged in the aperture of body 212. For example, connector base 316 may be arranged to partially extend into body 212. For another example, connector base 316 may be arranged to fully extend through body 212. Connector base 316 may be mechanically coupled to plug housing 312 via cable 314. For example, connector base 316 may be bonded to an end of cable 314 opposite an end which plug housing 312 is bonded.

Cable assembly 310 may also include an insulated wire 318. Insulated wire 318 may include a number of insulated wires, where at least one of the insulated wires is coupled to the connection pads in connector base 316. Further, insulated wire 318 may be arranged in an elongated cutout of docking station 210 extending from the aperture to an edge or edge surface of body 212. For example, insulated wire 318 may be located in an elongated cutout extending within body 212. For another example, insulated wire 318 may be located in an elongated cutout extending along a bottom surface of body 212. The elongated cutout of body 212 is further described with reference to FIGS. 4A to 7C.

Figure 4A:
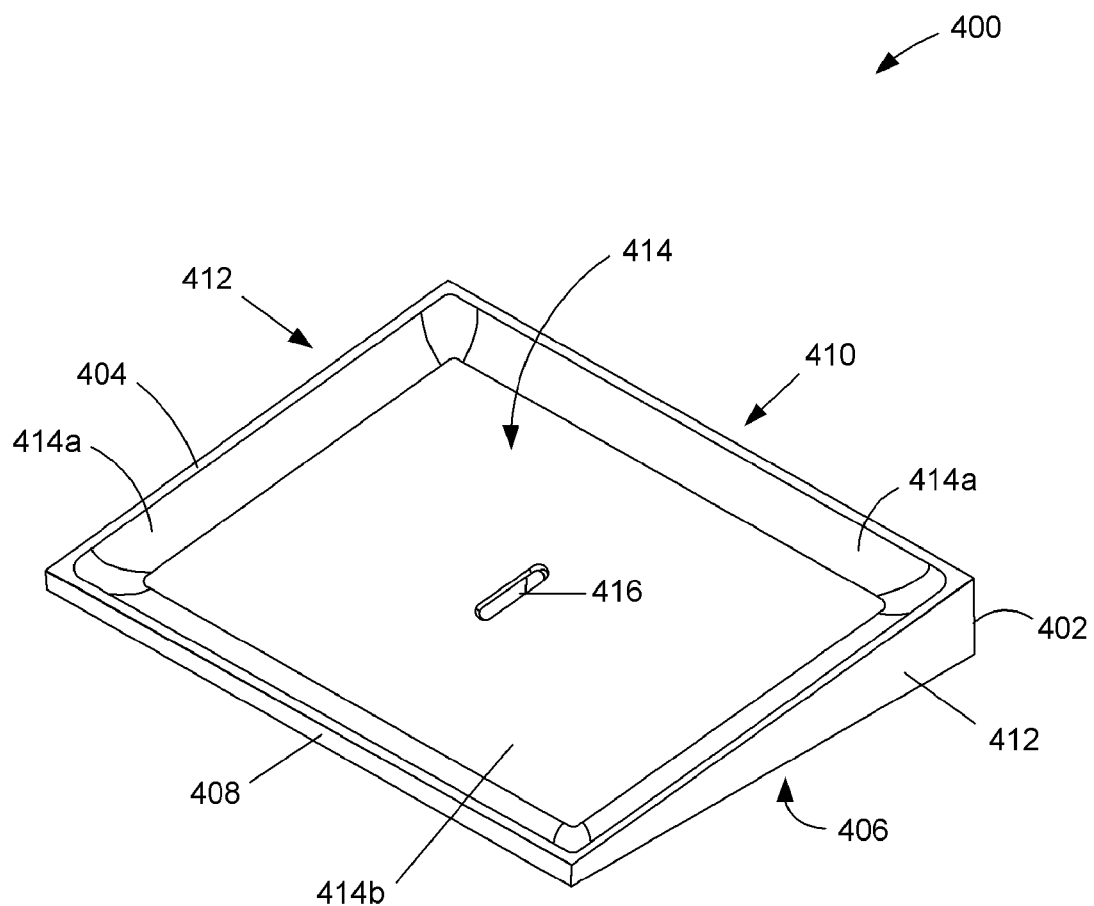
FIG. 4A illustrates a perspective view of a docking station according to a first embodiment of the present invention.

FIG. 4A illustrates a perspective view of a docking station 400 according to a first embodiment of the present invention. As shown in FIG. 4A, docking station 400 includes a body 402. In some embodiments, body 402 is substantially transparent; in other embodiments, body 402 is opaque. A substantially transparent body 402 formed in accordance with some embodiments of the present invention may advantageously result in various elements being hidden from view depending on the angle of view. For example, upon viewing a side of transparent body 402, a user may not be able to view portions of a cable assembly due to light refractions caused by the geometry of body 402.

In some embodiments, body 402 may be made from any materials suitable for forming a substantially solid entity. In other embodiments, body 402 may be made from any materials suitable for forming a malleable and/or flexible entity. For example, body 402 may be made from any suitable metal, minerals, ceramic, glass ceramic, wood, polymers, composite materials, semiconductors, nanomaterials, or biomaterials. According to one embodiment, body 402 is made from acrylic or an acrylic equivalent. According to another embodiment, body 402 is made from combinations of the above materials.

Body 402 includes a top or upper surface 404, a bottom surface 406, a front (or side) surface 408, a back (or side) surface 410, and side surfaces 412. Body 402 also includes a recessed region 414 formed at upper surface 404.

Recessed region 414 is shaped to receive an electronic device such that, when the electronic device is positioned in the recessed region, an exposed surface such as a display of the electronic device is substantially flush with a peripheral portion of the upper surface that surrounds the recessed region. For example, recessed region 414 may be shaped to form a substantially mirror image of rear surface 104, and optionally side surfaces 106, of electronic device 100. By forming recessed region 414 to have such a shape, when electronic device 100 is positioned within recessed region 414, upper surface 102 of electronic device 100 may be substantially flush with a peripheral portion of upper surface 404 that surrounds the recessed region. Further, when electronic device 100 is positioned within recessed region 414, the entire rear surface 104, and optionally the entire side surfaces 106, of electronic device 100 will abut a surface of recessed region 414.

According to one embodiment, recessed region 414 is recessed to a depth substantially equal to a thickness of an electronic device intended to be mounted in docking station 100. For example, recessed region 414 may be recessed to an amount substantially equal to the combined depth of a side surface 106 and rear surface 104 of electronic device 100. For another example, where electronic device 100 does not have side surfaces 106, recessed region 414 may be recessed to an amount substantially equal to the depth of rear surface 104. In this fashion, when electronic device 100 is positioned in recessed region 414, an exposed surface of electronic device 100 (i.e., upper surface 102) is substantially flush with a peripheral portion of the upper surface 404 that surrounds recessed region 414.

According to another embodiment, recessed region 414 is recessed to a depth greater than a thickness of an electronic device intended to be mounted in docking station 400. For example, recessed region 414 may be recessed to a depth including a thickness of pads 220 when compressed due to weight of device 100. The depth of recessed region 414 may thus be substantially equal to the combined thickness of a pad 220, depth of rear surface 104 of electronic device 100, and optional depth of a side surface 106 of electronic device 100. In this fashion, when electronic device 100 is positioned in recessed region 414 with pads 220 interposed therebetween, an exposed surface of electronic device 100 (i.e., upper surface 102) is substantially flush with a peripheral portion of the upper surface 404 that surrounds recessed region 114.

According to one embodiment, recessed region 414 includes curved surfaces 414a and a substantially planar surface 414b. For example, curved surfaces 414a may be shaped to receive curved surfaces 104a of electronic device 100, and substantially planar surface 414b may be shaped to receive substantially planar surface 104b of electronic device 100.

According to another embodiment, recessed region 414 does not include a substantially planar surface. Rather, the entire recessed region 414 is curved such that there are substantially no planar surfaces in recessed region 414. For example, where electronic device 100 includes an entire rear surface 104 that is curved such that there are substantially no planar surfaces in rear surface 104, recessed region 414 may be contoured accordingly such that the entire recessed region 414 is curved to match rear surface 104 of electronic device 100.

Recessed region 414 may be arranged to receive electronic devices having exposed surfaces of a variety of shapes. For example, recessed region 414 may be contoured to receive electronic device 100 having a rectangular upper surface 102. Other shapes of upper surface 102 that recessed region 414 may be adapted to receive include square, circular, oval, etc.

Upper surface 404 may be sloped upwards from front surface 408 to back surface 410 so that recessed region 414 is accordingly sloped upwards from front surface 408 to back surface 410. For example, a height of side surfaces 412 arranged proximate to front surface 408 may be smaller than a height of side surfaces 412 arranged proximate to back surface 410. As a result, upper surface 404 may be sloped upwards from front surface 408 to back surface 410 with respect to bottom surface 406. In some embodiments, upper surface 404 may be sloped upwards at an angle of approximately 7° with respect to bottom surface 406. In other embodiments, upper surface 404 may be sloped upwards at an angle in the range of approximately 4° and 10°. In yet other embodiments, upper surface 404 may be sloped upwards at an angle of less than 4° or greater than 10°. By angling upper surface 404 with respect to bottom surface 406, visibility of an exposed surface of a mounted electronic device 100 (e.g., upper surface 102) may be increased when docking station 400 is disposed on a horizontal surface.

Docking station 400 may include an aperture 416 formed at least partially through body 402 from recessed region 414 toward bottom surface 406. In one embodiment, aperture 416 extends only partially into body 402 such that aperture 416 terminates within body 402. In another embodiment, aperture 416 extends entirely through body 402 such that aperture 416 terminates at bottom surface 406 of body 402.

Aperture 416 may be sized to receive a cable assembly operable to connect to an electronic device when the electronic device is mounted within the recessed region. For example, aperture 416 may have a mirror-image shape of connector base 316 and have a diameter larger than a diameter of at least one of plug housing 312 and insulated wire 318. In this fashion, at least one of plug housing 312 and insulated wire 318 can pass through aperture 416 while connector base 316 may fit snugly within aperture 416.

Docking station 400 may include an elongated cutout (not illustrated in FIG. 4A) extending from aperture 416 to an edge (e.g., edges of front surface 408, back surface 410, or side surfaces 412) or edge surface (e.g., front surface 408, back surface 410, or a side surface 412) of body 402. The elongated cutout may be sized so that a cable of a cable assembly can fit within the aperture. For example, the elongated cutout may be sized to receive insulated wire 318.

According to one embodiment, the elongated cutout extends within body 402. For example, where aperture 416 terminates within body 402, the elongated cutout may extend from the point of termination within body 402 to a back surface 410 of body 402. According to another embodiment, the elongated cutout extends along bottom surface 406 of body 402. For example, where aperture 416 terminates at bottom surface 406 of body 402, the elongated cutout may extend from the point of termination at bottom surface 406 of body 402 to a bottom edge of body 402.

Figure 4B:
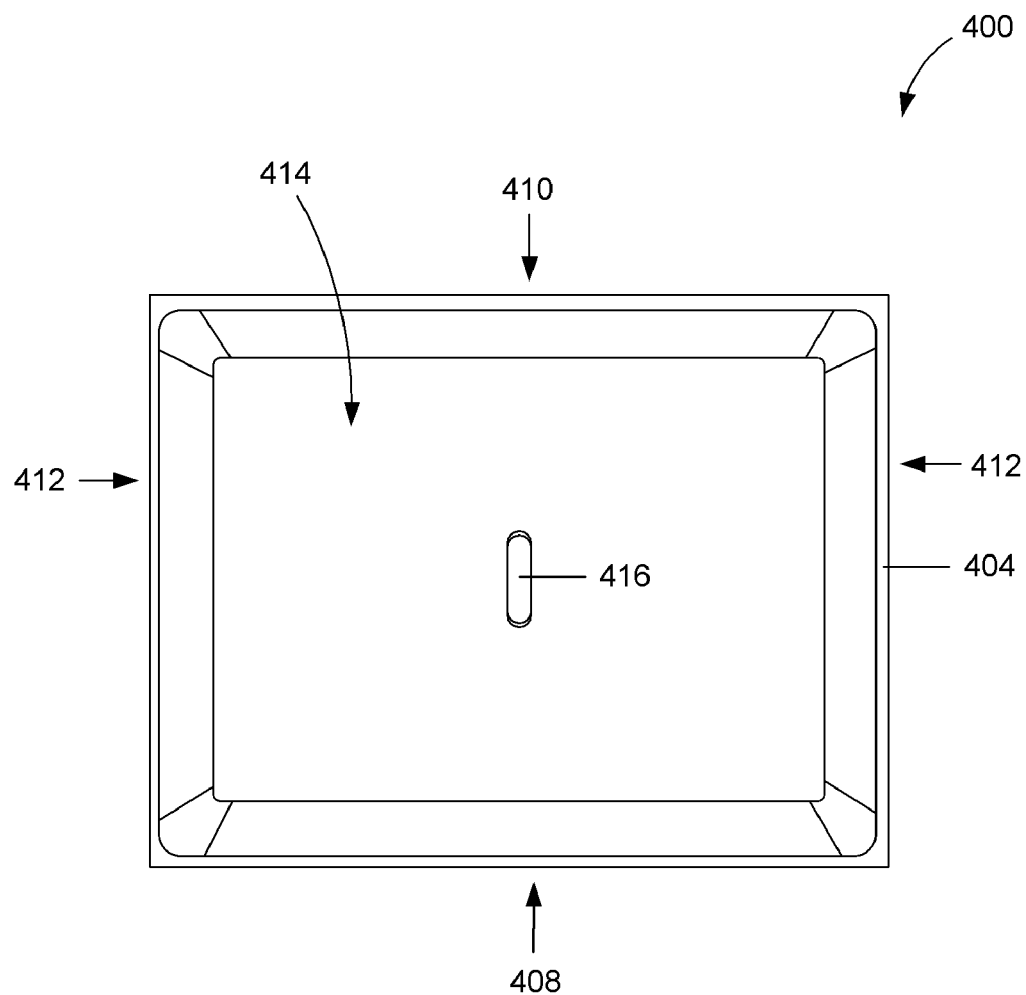
FIG. 4B illustrates a top view of the docking station shown in FIG. 4A.

FIG. 4B illustrates a top view of the docking station shown in FIG. 4A. From the top view, it is apparent that recessed region 414 may be contoured to receive electronic device 100 having a substantially rectangular upper surface 102. Corners of recessed region 414 and upper surface 404 may be rounded or at substantially perpendicular angles.

Aperture 416 may be provided at any location within recessed region 414. According to one embodiment, aperture 416 is located at a center of recessed region 414. According to other embodiments, aperture 416 is provided at a location offset from the center of recessed region 414; for example, aperture 416 may be provided at a location closer to front surface 408 than back surface 410, closer to back surface 410 than front surface 408, and/or closer to a side surface 412 than another side surface 412.

Aperture 416 may be arranged in any orientation within recessed region 414. According to one embodiment, aperture 416 is arranged such that side surfaces of aperture 416 are parallel to side surfaces 412. According to other embodiments, aperture 416 is arranged such that side surfaces of aperture 416 are arranged at an angle between 0 and 90 degrees from side surfaces 414.

Figure 4C:
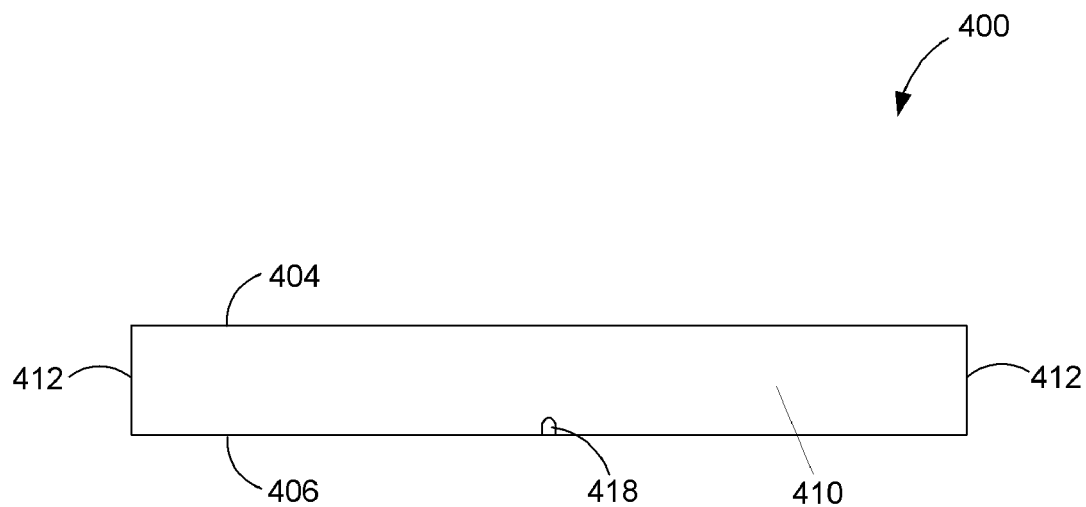
FIG. 4C illustrates a back view of the docking station shown in FIG. 4A.

FIG. 4C illustrates a back view of the docking station 400 shown in FIG. 4A. From the back view, an end portion of elongated cutout 418 may be seen. According to the embodiment illustrated in FIG. 4C, elongated cutout 418 extends along bottom surface 406 of body 402. According to another embodiment, as previously discussed, elongated cutout 418 may extend within body 402. In such a case, the end portion of elongated cutout 418 may appear as a circle arranged on back surface 410 between (but not in contact with) upper surface 404 and bottom surface 406.

As previously discussed, elongated cutout 418 may be sized to receive insulated wire 318. In one embodiment, insulated wire 318 has a substantially circular cross section, and elongated cutout 418 has a substantially circular cross section having a diameter slightly greater than the diameter of the insulated wire 318. For example, the diameter of elongated cutout 418 may be approximately 10% greater than the diameter of insulated wire 318. For another example, the diameter of elongated cutout 418 may be approximately 5% to 20% greater than the diameter of insulated wire 318. For yet another example, the diameter of elongated cutout 418 may be greater than the diameter of insulated wire 318 by an amount less than 5% or greater than 20%. In another embodiment, elongated cutout 418 has a cross section having a curved portion and planar portions. The smallest diameter of elongated cutout 418 may be greater than the largest diameter of insulated wire 318. In other embodiments, insulated wire 318 has a cross section of different shapes; for example, insulated wire 318 may have an oval cross section, square cross section, rectangular cross section, etc. Elongated cutout 418 may then similarly be shaped and sized to match the size and shape of insulated wire 318.

Figure 4D:
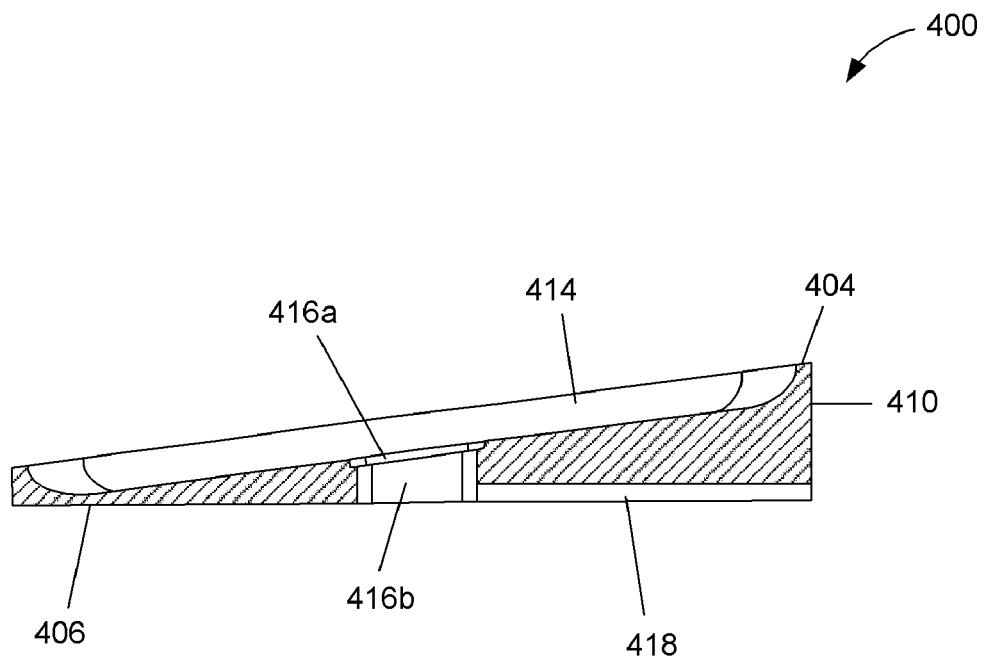
FIG. 4D illustrates a cross sectional view of the docking station shown in FIG. 4A.

FIG. 4D illustrates a cross sectional of the docking station 400 shown in FIG. 4A. From the side view, elongated cutout 418 may be seen. According to the embodiment illustrated in FIG. 4D, elongated cutout 418 extends along bottom surface 406 from aperture 416 to back surface 410. According to another embodiment, as previously discussed, elongated cutout 418 may extend within body 402. In such a case, elongated cutout 418 may be vertically displaced from bottom surface 406 such that elongated cutout 418 is arranged between (but not in contact with) upper surface 404 and bottom surface 406.

As previously discussed, docking station 400 may include an aperture 416 formed at least partially through body 402 from recessed region 414 toward bottom surface 406. According to the embodiment illustrated in FIG. 4D, aperture 416 extends entirely through body 402 such that aperture 416 terminates at bottom surface 406 of body 402. According to another embodiment, as previously discussed, aperture 416 may extend only partially into body 402 such that aperture 416 terminates within body 402. In such a case, aperture 416 may be vertically displaced from bottom surface 406 such that aperture 416 is arranged between recessed region 414 and bottom surface 406 but not in contact with bottom surface 406.

As also previously discussed, aperture 416 may be sized to receive a cable assembly operable to connect to an electronic device when the electronic device is mounted within the recessed region. In one embodiment, aperture 416 includes a first portion 416*a* and a second portion 416*b*. First portion 416*a* is recessed from recessed region 414 and extends from recessed region 414 toward bottom surface 406, while second portion 416*b* is recessed from first portion 416*a* and extends from bottom surface 406 toward recessed region 414. A diameter of first portion 416*a* may be greater than a diameter of second portion 416*b*. Further, an upper portion of connector base 316 may have a diameter greater than a diameter of a lower portion of connector base 316. First portion 416*a* may be sized to receive the upper portion of connector base 316, while second portion 416*b* may be sized to receive the lower portion of connector base 316. In this fashion, when aperture 416 receives connector base 316, a top surface of connector base 316 may be substantially flush with a surface of recessed region 414.

Figure 4E:
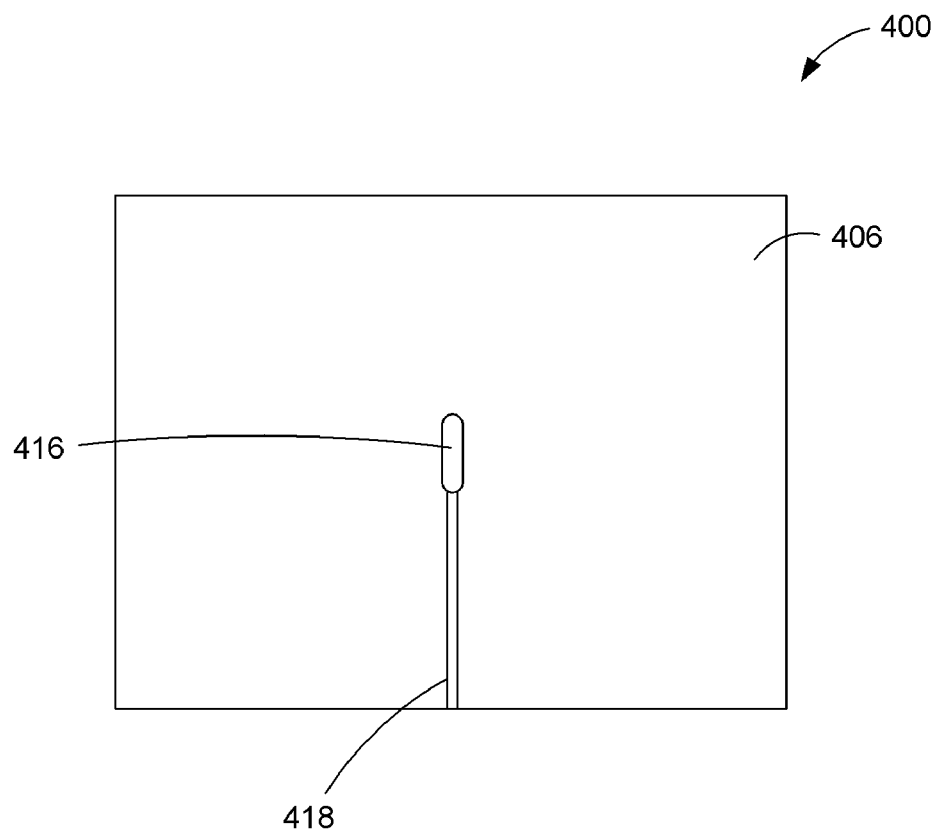
FIG. 4E illustrates a bottom view of the docking station shown in FIG. 4A.

FIG. 4E illustrates a bottom view of the docking station 400 shown in FIG. 4A. From the bottom view, aperture 416 and elongated cutout 418 may be seen. According to the embodiment illustrated in FIG. 4E, aperture 416 extends entirely through body 402 and elongated cutout 418 extends along bottom surface 406 from aperture 416 to back surface 410. According to another embodiment, as previously discussed, aperture 416 may extend only partially into body 402 and elongated cutout 418 may extend within body 402. In such a case, neither aperture 416 nor elongated cutout 418 would be seen in this view.

Figure 5A:
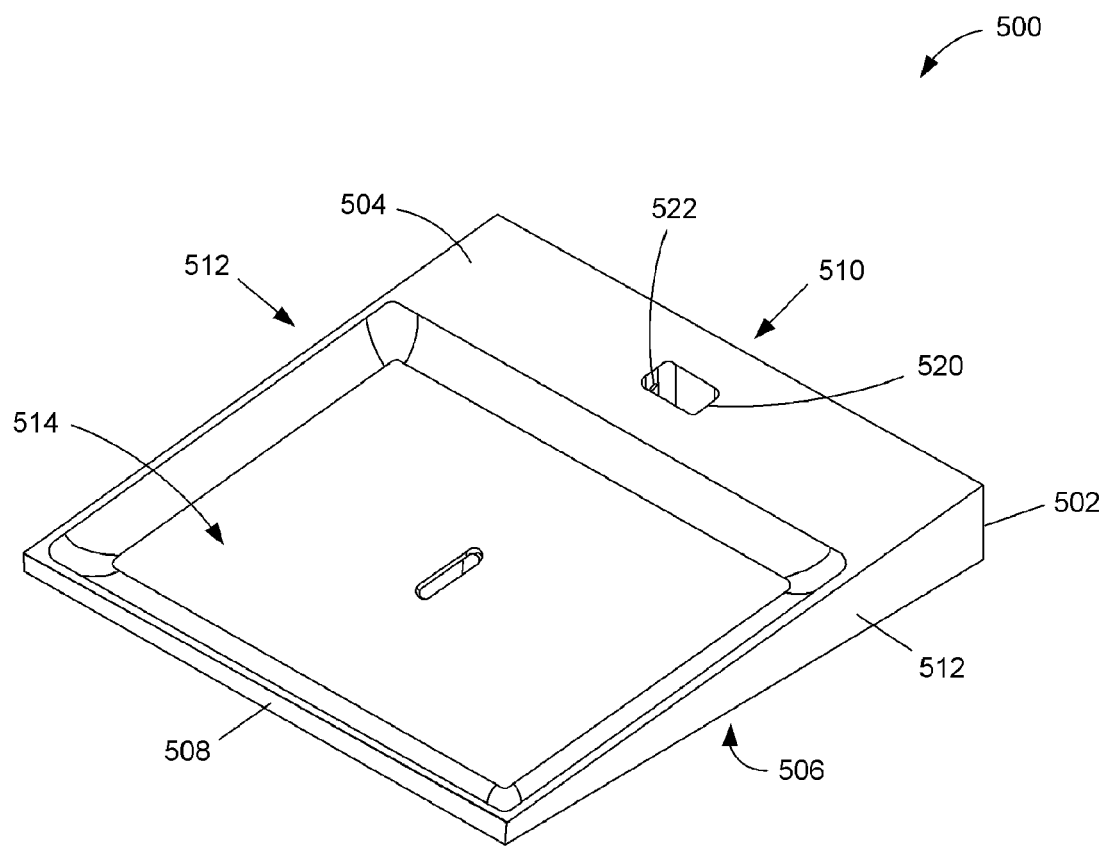
FIG. 5A illustrates a perspective view of a docking station according to a second embodiment of the present invention.
Figure 5B:
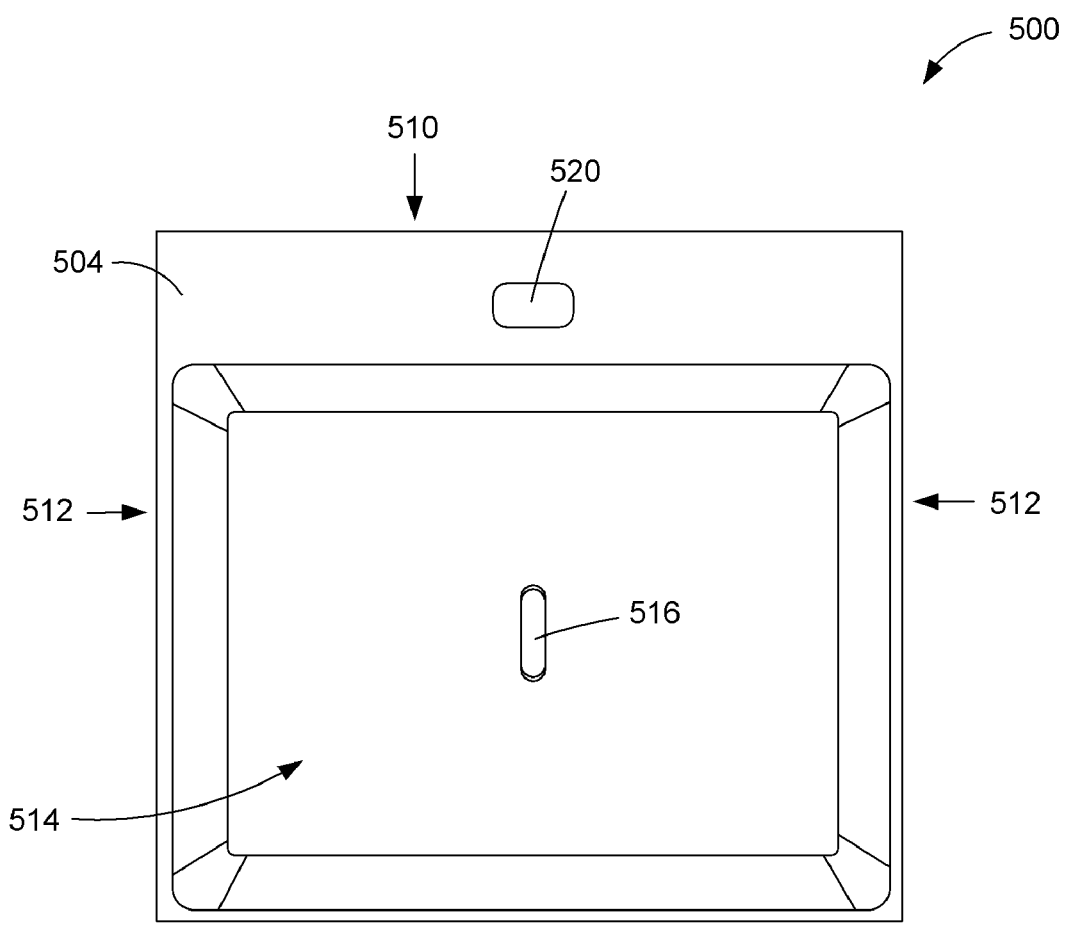
FIG. 5B illustrates a top view of the docking station shown in FIG. 5A.
Figure 5C:
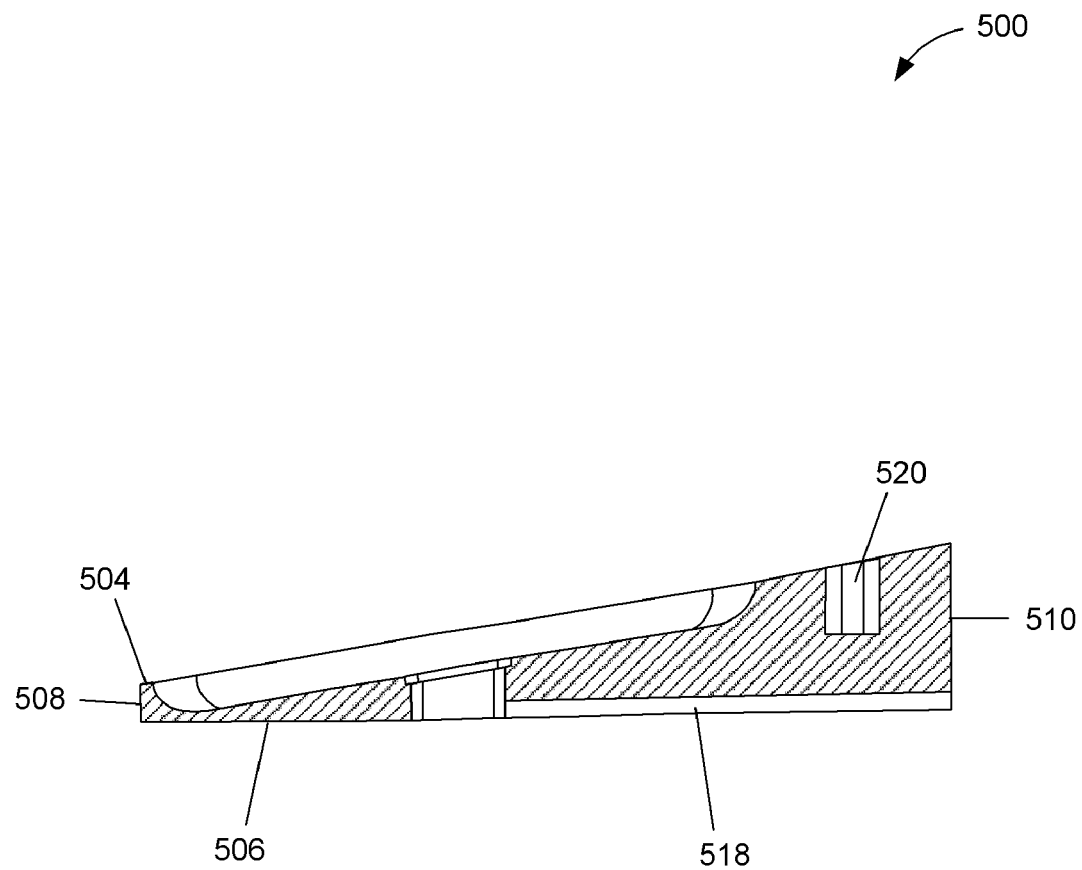
FIG. 5C illustrates a cross sectional view of the docking station shown in FIG. 5A.

FIG. 5A illustrates a perspective view of a docking station 500 according to a second embodiment of the present invention. Docking station 500 may include some or all of the features discussed above with reference to FIGS. 4A to 4E. Accordingly, the features referenced with the 500 series labels illustrated in FIGS. 5A to 5C are the same as those labeled with the 400 series in FIGS. 4A to 4E. For example, docking station 500 includes a body 502, which includes a top or upper surface 504, a bottom surface 506, a front surface 508, a back surface 510, and side surfaces 512, respectively the same as the previously discussed features labeled 402 to 412.

According to the embodiment illustrated in FIG. 5A, docking station 500 further includes an additional cutout 520 formed at least partially through body 502 from upper surface 504 toward bottom surface 506 and between recessed region 514 and back surface 510. Additional cutout 520 may be sized to receive a stand (not illustrated) for an additional electronic device (not illustrated). The stand may be designed so that, when the stand and the additional electronic device are engaged and the stand is arranged within additional cutout 520, the additional electronic device is positioned above top surface 504 of body 502. In this fashion, the additional electronic device may be positioned proximate to an electronic device 100 mounted within recessed region 514 of docking station 500, and electronic device 100 may function to display advertising information related to the additional electronic device.

Additional cutout 520 may include notches 522 for engaging with coupling portions of the stand. For example, the stand may include coupling portions such as a spring-loaded ball bearing, or pins, protruding from one or more surfaces of the stand. The coupling portions may be operable to engage the notches 522 such that the stand remains mounted in additional cutout 520 in the event the electronic device is removed from the stand.

In some embodiments, additional cutout 520 may be formed at least partially through body 502 from a surface other than upper surface 504. For example, additional cutout 520 may be formed from a side surface 512 toward another side surface 512.

FIG. 5B illustrates a top view of the docking station 500 shown in FIG. 5A. From the top view, it is apparent that additional cutout 520 may have any shape at top surface 504. For example, additional cutout 520 may be rectangular, square, circular, oval, etc. Further, additional cutout 520 may be provided at any location on upper surface 504. For example, top surface 504 may include a substantially planar portion extending from recessed region 514 to rear surface 510. Additional cutout 520 may then be provided on this substantially planar portion. For another example, top surface 504 may include a substantially planar portion extending from recessed region 514 to one or more of side surfaces 512. Similarly, additional cutout 520 may then be provided on this substantially planar portion. Further yet, additional cutout 520 may be provided in a same plane as aperture 516 (as illustrated in FIG. 5B) or in a different plane.

According to one embodiment, additional cutout 520 has a substantially rectangular shape at top surface 504. Accordingly, additional cutout 520 includes two pairs of opposing, substantially planar surfaces, where notches 522 are etched from one pair of opposing surfaces. Adjacent surfaces may be connected via curved corners or substantially perpendicular corners.

FIG. 5C illustrates a cross sectional of the docking station 500 shown in FIG. 5A. From the side view, the formation of additional cutout 520 partially through body 502 can be seen. Additional cutout 520 extends into body 502 toward but not in contact with elongated cutout 518. According to the embodiment illustrated in FIG. 5C, elongated cutout 518 extends along bottom surface 506 from aperture 516 to back surface 510. In such a case, additional cutout 520 may extend almost entirely through body 502. However, according to another embodiment, as previously discussed, elongated cutout 518 may extend within body 502. In such a case, additional cutout 520 may extend only partially into body 502. For example, additional cutout 520 may extend half way or a quarter way into body 502. According to other embodiments, additional cutout 520 may not be located in a same plane as elongated cutout 518. In such a case, additional cutout 520 may extend entirely through body 502 from upper surface 504 to lower surface 506.

According to one embodiment, a bottom surface of additional cutout 520 is substantially planar and in parallel with bottom surface 506 of body 502. Further, a top surface of additional cutout 520 is substantially planar and sloped upwards from front surface 508 of body 502 to back surface 510 of body. The slope of the top surface of additional cutout 520 may be the same as or different than a slope of upper surface 504. In other embodiments, the bottom surface of additional cutout 520 may be sloped, and the top surface of additional cutout 520 may be substantially parallel with bottom surface 506.

Figure 6A:
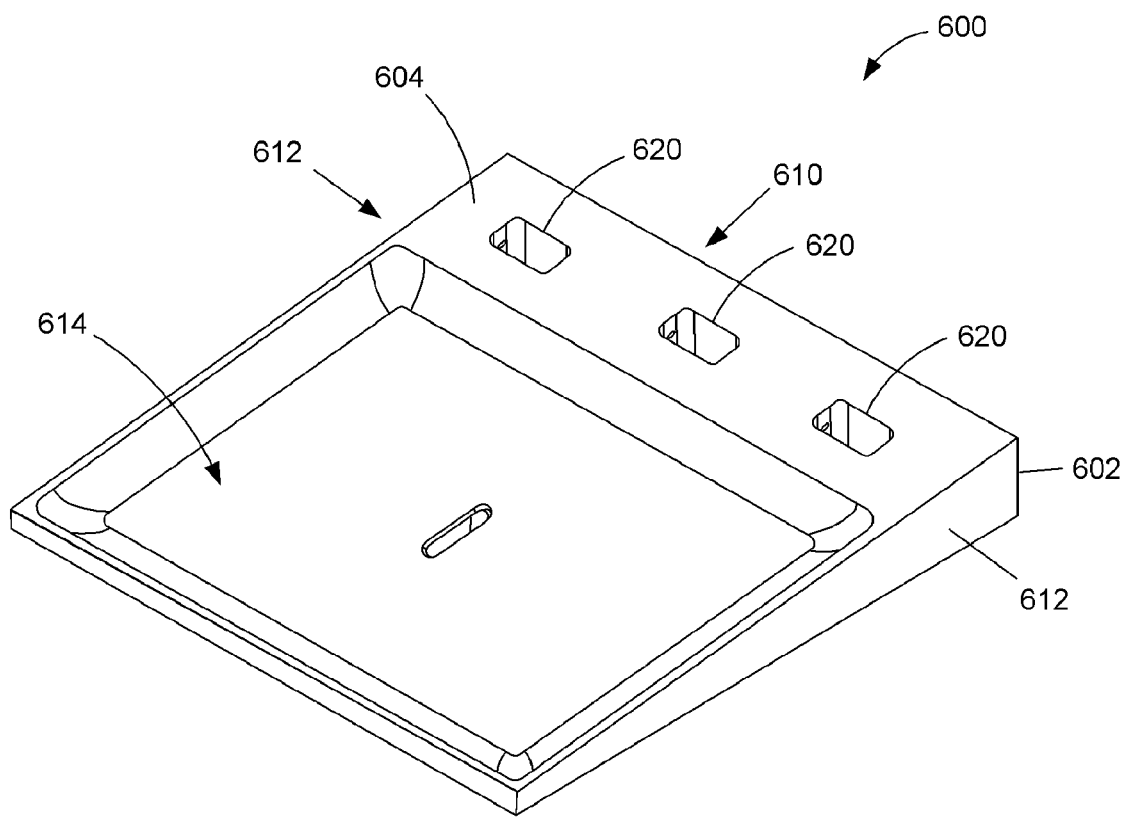
FIG. 6A illustrates a perspective view of a docking station according to a third embodiment of the present invention.
Figure 6B:
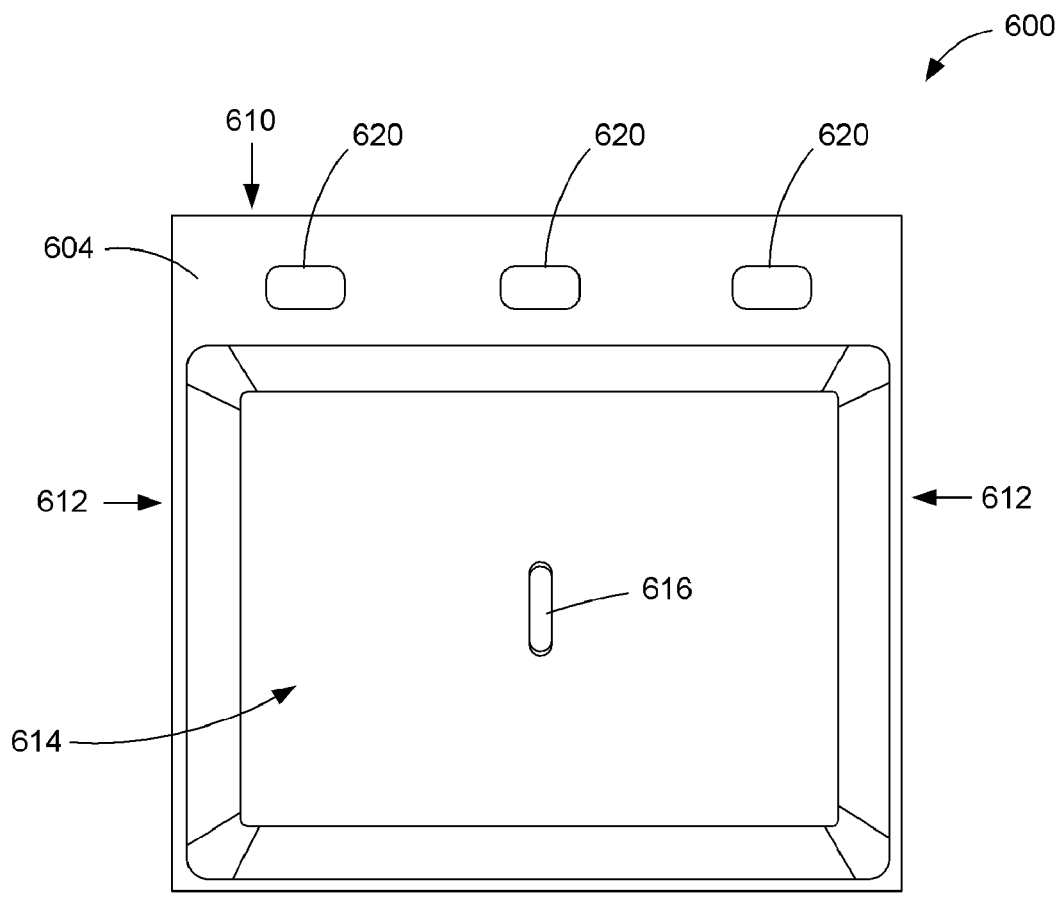
FIG. 6B illustrates a top view of the docking station shown in FIG. 6A.

FIG. 6A illustrates a perspective view of a docking station 600 according to a third embodiment of the present invention. The embodiment illustrated in FIG. 6A is substantially similar to that illustrated in FIG. 5A. Accordingly, the features referenced with the 600 series labels illustrated in FIGS. 6A and 6B are the same as those labeled with the 500 series in FIGS. 5A to 5C. However, according to the embodiment illustrated in FIG. 6A, additional cutouts 620 are provided.

Additional cutouts 620 may be arranged anywhere on top surface 604 outside of recessed region 614. In one embodiment, as illustrated in FIG. 6A, the additional cutouts 620 are all arranged between recessed region 614 and back surface 610. In other embodiments, one or more cutouts 620 may be arranged between recessed region 614 and back surface 610 while one or more cutouts 620 are arranged between recessed region 614 and another surface such as a side surface 612. In other embodiments, one or more cutouts 620 may be arranged between recessed region 614 and one of side surfaces 612 and one or more cutouts 620 may be arranged between recessed region 614 and another one of side surfaces 612. In yet other embodiments, the cutouts 620 may be arranged between recessed region 614 and one of side surfaces 612.

Additional cutouts 620 may be arranged in the same or different planes. In one embodiment, as illustrated in FIG. 6A, the additional cutouts 620 are all arranged in the same plane extending between side surfaces 612. In other embodiments, additional cutouts 620 are arranged in different planes; for example, they may be offset from one another with reference to a plane extending between side surfaces 612.

FIG. 6B illustrates a top view of the docking station 600 shown in FIG. 6A. From the top view, it is apparent that additional cutouts 620 may have any shape and, as previously discussed, be provided at any location on upper surface 604.

Figure 7A:
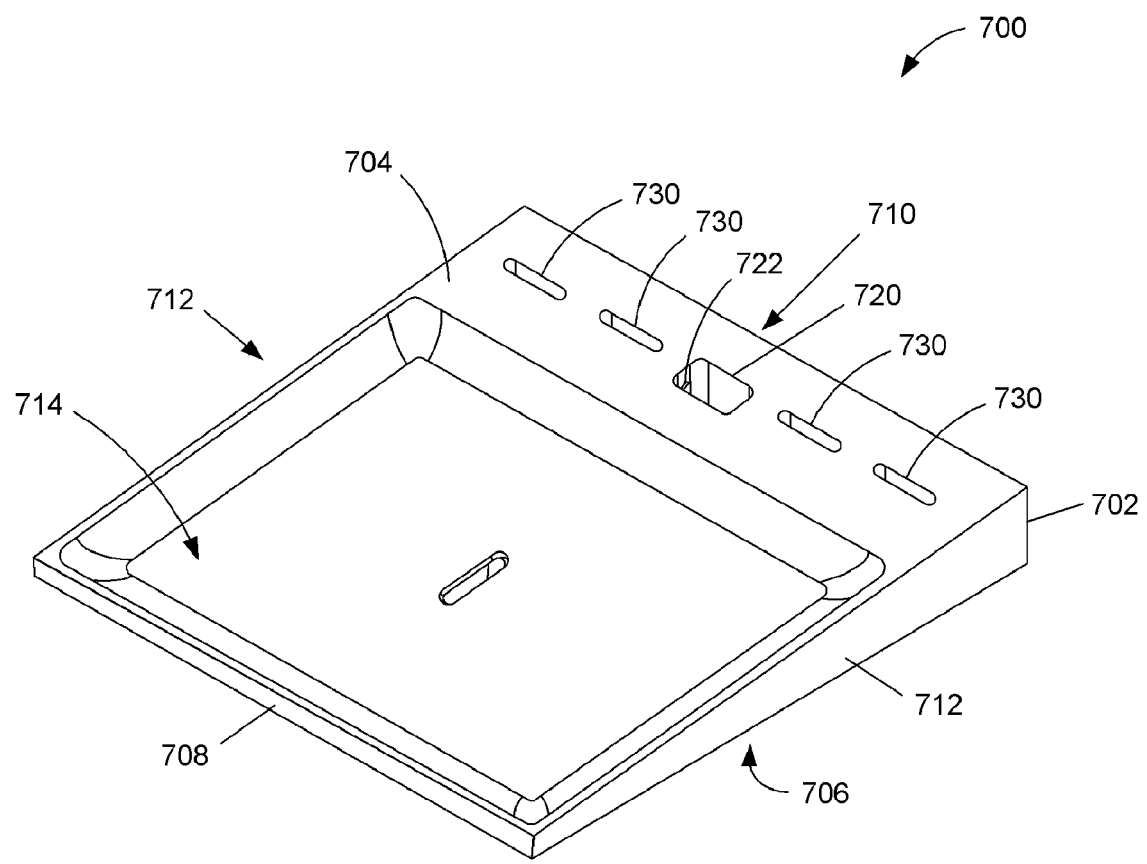
FIG. 7A illustrates a perspective view of a docking station according to a fourth embodiment of the present invention.
Figure 7B:
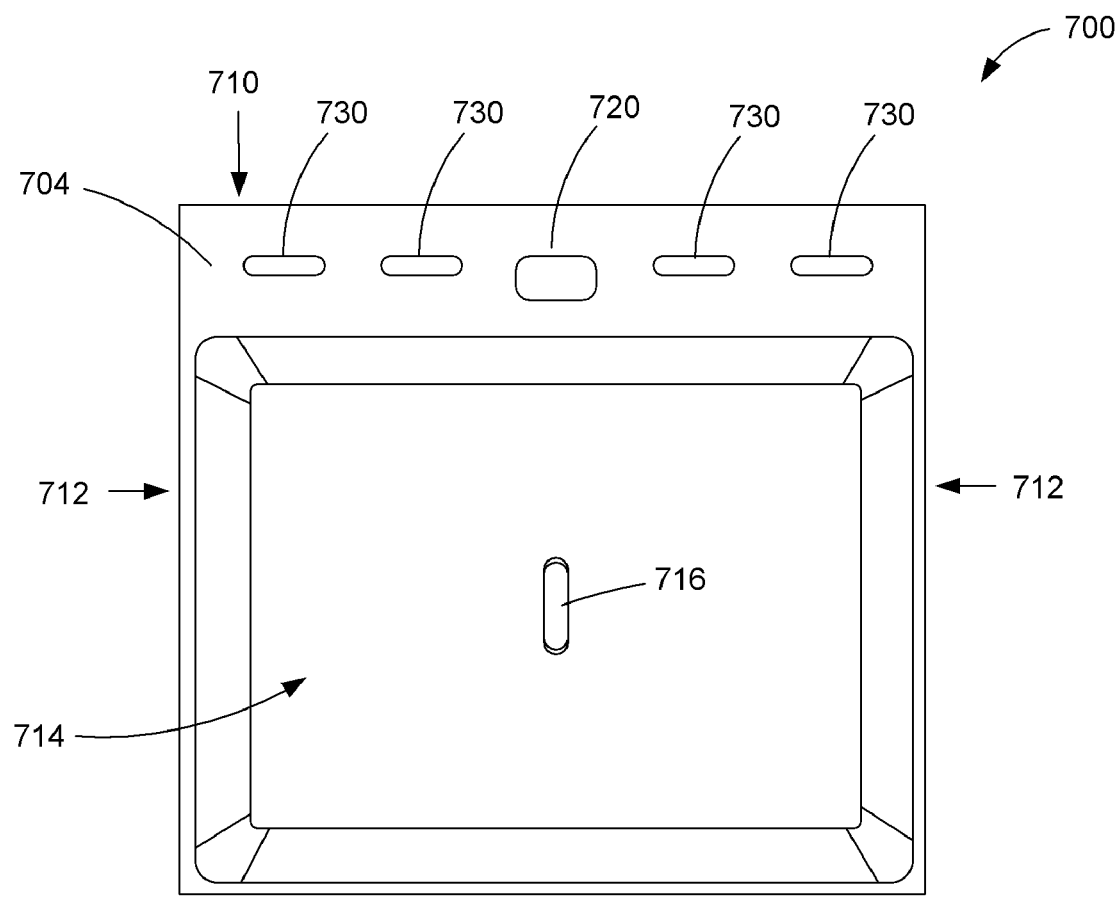
FIG. 7B illustrates a top view of the docking station shown in FIG. 7A.
Figure 7C:
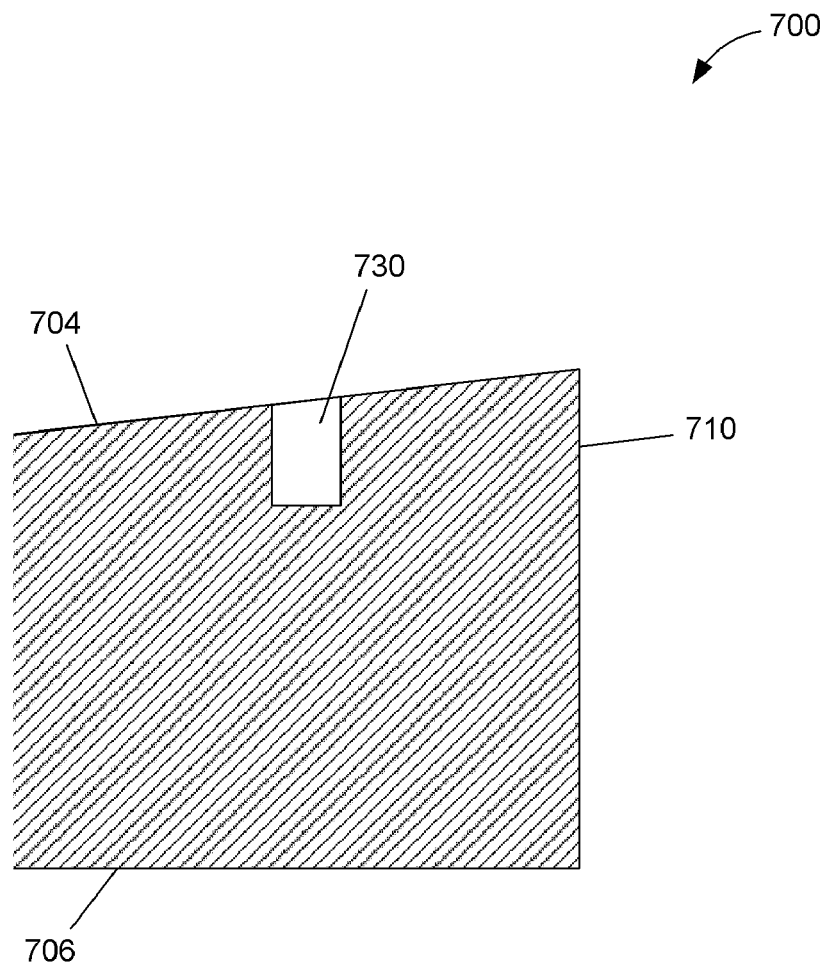
FIG. 7C illustrates a partial cross sectional view of the docking station shown in FIG. 7A.

FIG. 7A illustrates a perspective view of a docking station 700 according to a fourth embodiment of the present invention. The embodiment illustrated in FIG. 7A is substantially similar to that illustrated in FIG. 5A. Accordingly, the features referenced with the 700 series labels illustrated in FIGS. 7A to 7C are the same as those labeled with the 500 series in FIGS. 5A to 5C. However, according to the embodiment illustrated in FIG. 7A, additional cutouts 730 are provided.

Each additional cutout 730 is formed at least partially through body 702 from upper surface 704 toward bottom surface 706 and between recessed region 714 and back surface 710. Each additional cutout 730 may be sized to receive a stand (not illustrated) for an additional electronic device (not illustrated). The stand may be designed so that, when the stand and the additional electronic device are engaged and the stand is arranged within additional cutout 730, the additional electronic device is positioned above top surface 704 of body 702. In this fashion, the additional electronic device may be positioned proximate to an electronic device 100 mounted within recessed region 714 of docking station 700, and electronic device 100 may function to display advertising information related to the additional electronic device.

Compared to cutout 720, additional cutouts 730 may be smaller. Accordingly, additional cutouts 730 may be used to mount additional electronic devices smaller than those mounted on cutout 720. For example, cutout 720 may be used to mount an additional electronic device having a cable assembly attached thereto, whereas additional cutouts 730 may be used to mount additional electronic devices not attached to cable assemblies. Further, additional cutouts 730 may not include notches 722, and may have a shape different than a shape of cutout 720.

FIG. 7B illustrates a top view of the docking station 700 shown in FIG. 7A. From the top view, it is apparent that additional cutouts 730 may have any shape at top surface 704. For example, additional cutouts 730 may be oval, circular, square, rectangular, etc. Further, additional cutouts 730 may be provided at any location on upper surface 704. For example, top surface 704 may include a substantially planar portion extending from recessed region 714 to rear surface 710. Additional cutouts 730 may then be provided on this substantially planar portion. For another example, top surface 704 may include a substantially planar portion extending from recessed region 714 to one or more of side surfaces 712. Similarly, additional cutouts 730 may then be provided on this substantially planar portion. Further yet, additional cutouts 730 may be arranged in the same or different planes, as discussed above with reference to additional cutouts 620.

According to one embodiment, additional cutouts 730 each have a substantially oval shape at top surface 704. Accordingly, additional cutouts 730 each includes one pair of opposing, substantially planar surfaces, and one pair of opposing, curved surfaces. Notches, as described with reference to FIG. 5A, may or may not be included in the pair of opposing, substantially planar surfaces.

FIG. 7C illustrates a partial cross sectional view of the docking station 700 shown in FIG. 7A. From the side view, the formation of one of additional cutouts 730 partially through body 702 can be seen. Additional cutout 730 extends into body 702 toward but not in contact with an elongated cutout (not shown). According to one embodiment, the elongated cutout extends along bottom surface 706 from aperture 716 to back surface 710. In such a case, the additional cutouts 730 may extend almost entirely through body 702. However, according to another embodiment, as previously discussed, the elongated cutout may extend within body 702. In such a case, the additional cutouts 730 may extend only partially into body 702. For example, the additional cutouts 730 may extend half way or a quarter way into body 702. According to other embodiments, as illustrated in FIG. 7C, at least one of the additional cutouts 730 is not located in a same plane as the elongated cutout. In such a case, the at least one additional cutout 730 may extend entirely through body 702 from upper surface 704 to lower surface 706.

According to one embodiment, a bottom surface of at least one additional cutout 730 is substantially planar and in parallel with bottom surface 706 of body 702. Further, a top surface of the additional cutout 730 is substantially planar and sloped upwards from front surface 708 of body 702 to back surface 710 of body. The slope of the top surface of the additional cutout 730 may be the same as or different than a slope of upper surface 704. In other embodiments, the bottom surface of at least one additional cutout 730 may be sloped, and the top surface of at least one additional cutout 730 may be substantially parallel with bottom surface 706.

Figure 8:
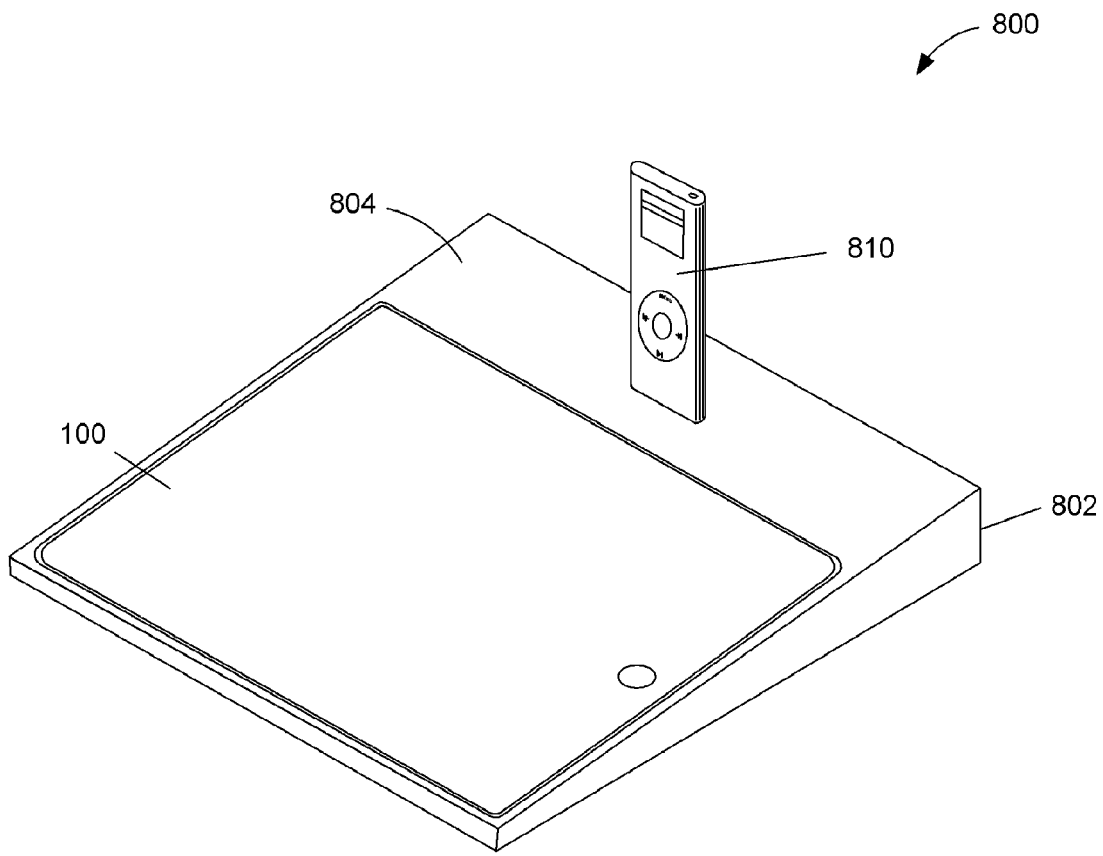
FIG. 8 illustrates a digital signage system according to a third embodiment of the present invention.

FIG. 8 illustrates a digital signage system 800 according to a third embodiment of the present invention. Digital signage system 800 includes an electronic device 100 such as that previously described, a docking station 802 having a top surface 804 for mounting electronic device 100, an additional electronic device 810, and a stand (not illustrated) for engaging docking station 802 and additional electronic device 810.

As shown in FIG. 8, electronic device 100 is mounted within a recessed region of docking station 802 such that an exposed surface of electronic device 100 is substantially flush with a top surface 804 of docking station 802. Further, additional electronic device 810 is mounted on a stand (not illustrated) that is arranged in an additional cutout of docking station 802.

According to this embodiment, the additional electronic device 810 is a portable media device. For example, additional electronic device 810 may be an iPod as manufactured by Apple, Inc. of Cupertino, Calif. According to other embodiments of the present invention, additional electronic device 810 is not a portable media device. Rather, additional electronic device 810 may be any portable electronic device. For example, additional electronic device 810 may be a personal digital assistance (PDA), a camera, a game player, a cellular phone, etc.

Additional electronic device 810 may be arranged on docking station 802 so that a bottom surface of additional electronic device 810 is substantially flush with top surface 804. In some embodiments, the bottom surface of additional electronic device 810 may be embedded within additional electronic device 810, or provided above top surface 804. Additional electronic device 810 may be arranged such that it extends in a direction substantially perpendicular to top surface 804. In some embodiments, additional electronic device 810 is arranged such that it extends at an angle with respect to top surface 804. For example, additional electronic device 810 may be arranged to extend at an angle of 45 degrees with respect to top surface 804, or in a range of 30 degrees to 70 degrees, or in a range of 5 degrees to 85 degrees.

Additional electronic device 810 may be arranged on docking station 802 such that a display surface of additional electronic device 810 is in a direction facing electronic device 100. For example, the display surface of additional electronic device 810 may be arranged to be parallel with a front surface of docking station 802. Additional electronic device 810 may be arranged such that its display surface is in other directions as well. For example, it may be arranged at an angle of 45 degrees with respect to the front surface of docking station 802, or in a range of 30 degrees to 70 degrees, or in a range of 5 degrees to 85 degrees. In some embodiments, the angle may be variable. For example, the stand may be provided such that additional electronic device 810 is rotatable while mounted on docking station 802.

In some embodiments, additional electronic device 810 may be arranged on surfaces of docking station 802 other than top surface 804. For example, additional electronic device 810 may be arranged on a side surface of docking station 802. In other embodiments, more than one additional electronic device 810 may be provided. The additional electronic devices 810 may be identical to one another, or different than one another. For example, they could be the same device but with different colors. For another example, one additional electronic device could be a video player, while another additional electronic device could be a music player.

Digital signage system 800 may optionally include other previously discussed features. For example, digital signage system 800 may include one or more pads 220. For another example, digital signage system 800 may include cable assembly 310.

Various embodiments for improved docking stations according to the present invention have been described. While these inventions have been described in the context of the above specific embodiments, many modifications and variations are possible. The above description is therefore for illustrative purposes and is not intended to be limiting.

For example, additional cutouts and apertures could be incorporated into the docking station. In one embodiment, with reference to FIG. 4A, additional cutouts could be incorporated into a surface such as curved surface 414a to enable access to buttons on a side surface 106 of electronic device 100. In another embodiment, apertures passing entirely through curved surface 414a and side surface 412 may be provided to enable cable access to interfaces provided on a side surface 106 of electronic device 100, such as a headphone jack. In another embodiment, apertures passing entirely through substantially planar surface 414b may be provided to enable access to buttons, such as a power button, on rear surface 104 of electronic device. In yet another embodiment, with reference to FIG. 5A, additional apertures could be incorporated between the additional cutout 520 and other surfaces of or locations within body 502, to enable a cable connectable to an additional electronic device mounted within additional cutout 520 to pass into or through body 502. In one case, an aperture may be formed from additional cutout 520 to back surface 510, thereby enabling cables connectable to an additional electronic device mounted within additional cutout 520 to pass through back surface 510 from additional cutout 520.

For another example, various combinations of the discussed embodiments may be realized. For example, one or more of pads 220 described with reference to FIG. 2 may be incorporated in the digital signal system 300 described with reference to FIG. 3. For another example, additional cutouts 730 may be provided without additional cutout 720.

Also, references to top or bottom, or front and back of the various structures described above are relative and are used interchangeably depending on the point of reference. Similarly, dimensions and sizes provided throughout the above description are for illustrative purposes only and the inventive concepts described herein can be applied to structures with different dimensions. Accordingly, the scope and breadth of the present invention should not be limited by the specific embodiments described above and should instead be determined by the following claims and their full extend of equivalents.

What is claimed is:

1. A digital signage system comprising:
   an electronic device having a rear surface and an opposing front surface at which a display of the electronic device may be viewed;
   a body for supporting the electronic device, the body having a front surface, a back surface, and upper and lower surfaces extending between the front and back surfaces, wherein a recessed region is formed within the body from the upper surface;
   an aperture formed at least partially through the body from the recessed region toward the lower surface of the body, the aperture being sized to receive a cable assembly operable to connect to the electronic device when the electronic device is mounted within the recessed region, wherein the aperture includes a first portion and a second portion, the first portion extending from the recessed region toward the lower surface of the body and ending at a location within the body, the second portion extending from the location at which the first portion ends toward the lower surface of the body, the first portion having a diameter greater than a diameter of the second portion; and
   a cable assembly including:
      a connector base, mechanically coupled to a plug housing by a cable, the connector base having a plurality of connection pads electrically coupled to respective ones of a plurality of conductive traces of the cable; and
      an insulated wire coupled to the connection pads;
   wherein the electronic device is positioned within the recessed region such that the rear surface of the electronic device fits entirely within the recessed region and the front surface of the electronic device is substantially flush with a portion of the upper surface that surrounds the recessed region.

2. The digital signage system of claim 1 further comprising an elongated cutout extending from the aperture to an edge or edge surface of the body, the elongated cutout being sized so that the insulated wire of the cable assembly can extend from the aperture to the edge or edge surface of the body when the insulated wire is arranged within the elongated cutout.

3. The digital signage system of claim 1 wherein the recessed region is shaped to receive the electronic device such that, when the electronic device is mounted within the recessed region, side surfaces of the electronic device abut surfaces of the recessed region.

4. The digital signage system of claim 1 wherein the recessed region is sloped upwards from the front surface of the body to the back surface of the body with respect to the lower surface of the body.

5. The digital signage system of claim 2 wherein the aperture is formed entirely through the body from the recessed region to the lower surface of the body.

6. The digital signage system of claim 5 wherein the elongated cutout extends along the bottom surface of the body or extends within the body.

7. The digital signage system of claim 1 wherein the first portion is recessed from the recessed region such that, when the aperture receives the cable assembly, a top surface of the connector base of the cable assembly is flush with a surface of the recessed region.

8. The digital signage system of claim 1 further comprising at least one additional cutout formed at least partially through the body from the upper surface of the body toward the lower surface of the body and between the recessed region and an edge of the body, each additional cutout sized to receive a stand for an additional electronic device.

9. The digital signage system of claim 8 wherein each additional cutout includes a plurality of notches for engaging with coupling portions of the stand.

10. A digital signage system comprising:
    an electronic device having a rear surface and an opposing front surface at which a display of the electronic device may be viewed;
    a body for supporting the electronic device, the body having a front surface, a back surface, and top and bottom surfaces extending between the front and back surfaces;
    a recessed region formed within the body from the top surface;
    an aperture formed at least partially through the body for receiving a cable assembly operable to connect to the electronic device; and
    a cable assembly including:
       a connector base, mechanically coupled to a plug housing by a cable, the connector base having a plurality of connection pads electrically coupled to respective ones of a plurality of conductive traces of the cable; and
       an insulated wire coupled to the connection pads;
    wherein the electronic device is positioned within the recessed region such that the rear surface of the electronic device fits entirely within the recessed region and the front surface of the electronic device is substantially flush with a portion of the top surface that surrounds the recessed region.

11. The digital signage system of claim 10 further comprising at least one additional cutout formed partially through the body from the top surface of the body toward the bottom surface of the body and between the recessed region and an edge of the body.

12. The digital signage system of claim 11 further comprising, for each additional cutout, an additional electronic device and a stand for mounting the additional electronic device on the body.

13. The digital signage system of claim 12 wherein the additional cutout includes a plurality of notches and the stand includes a corresponding plurality of coupling portions, the plurality of coupling portions being operable to engage the plurality of notches such that the stand remains mounted in the additional cutout when the additional electronic device is removed from the stand.

14. The digital signage system of claim 10 further comprising a plurality of pads arranged between the electronic device and the recessed region, wherein at least one of the pads is flexible and located proximate to a button provided on the electronic device.

15. The digital signage system of claim 10 wherein the cable is arranged between the electronic device and the recessed region and extends from the aperture to an edge of the electronic device.

16. The digital signage system of claim 15 wherein the plug housing is coupled to an end of the cable proximate to the edge of the electronic device.

17. The digital signage system of claim 10 wherein the connector base is arranged in the aperture.

18. The digital signage system of claim 10 wherein the insulated wire is arranged in an elongated cutout extending from the aperture to an edge or edge surface of the body.

19. A docking station comprising:
an electronic device having a rear surface and an opposing front surface at which a display of the electronic device may be viewed;
an acrylic body for supporting the electronic device, the body having a front surface, a back surface, and upper and bottom surfaces extending between the front and back surfaces, the body having a substantially rectangular recessed region formed from its upper surface, the recessed region having a curved surface and being sloped upwards from the front surface of the body to the back surface of the body with respect to the bottom surface of the body;
an aperture formed at least partially through the body from the recessed region toward the bottom surface of the body, the aperture being sized to receive a cable assembly operable to connect to the electronic device when the electronic device is mounted within the recessed region, wherein the aperture includes a first portion and a second portion, the first portion extending from the recessed region toward the bottom surface of the body and ending at a location within the body, the second portion extending from the location at which the first portion ends toward the bottom surface of the body, the first portion having a diameter greater than a diameter of the second portion; and
a cable assembly including:
a connector base, mechanically coupled to a plug housing by a cable, the connector base having a plurality of connection pads electrically coupled to respective ones of a plurality of conductive traces of the cable; and
an insulated wire coupled to the connection pads;
wherein the electronic device is positioned within the recessed region such that the rear surface of the electronic device fits entirely within the recessed region and the front surface of the electronic device is substantially flush with a portion of the upper surface that surrounds the recessed region.

20. The docking station of claim 19 wherein the recessed region is shaped to receive the electronic device such that, when the electronic device is mounted within the recessed region, side surfaces of the electronic device abut curved surfaces of the recessed region.

21. The docking station of claim 19 wherein the aperture is formed entirely through the body from the recessed region to the bottom surface of the body.

22. The docking station of claim 19 further comprising at least one additional cutout formed partially through the body from the upper surface of the body toward the bottom surface of the body and between the recessed region and an edge of the body, each additional cutout sized to receive a stand for an additional electronic device.

* * * * *